L. KLEINHANS.
CHANGE MAKER AND INDICATOR.
APPLICATION FILED JUNE 29, 1904.
976,129.
Patented Nov. 15, 1910.
14 SHEETS—SHEET 1.
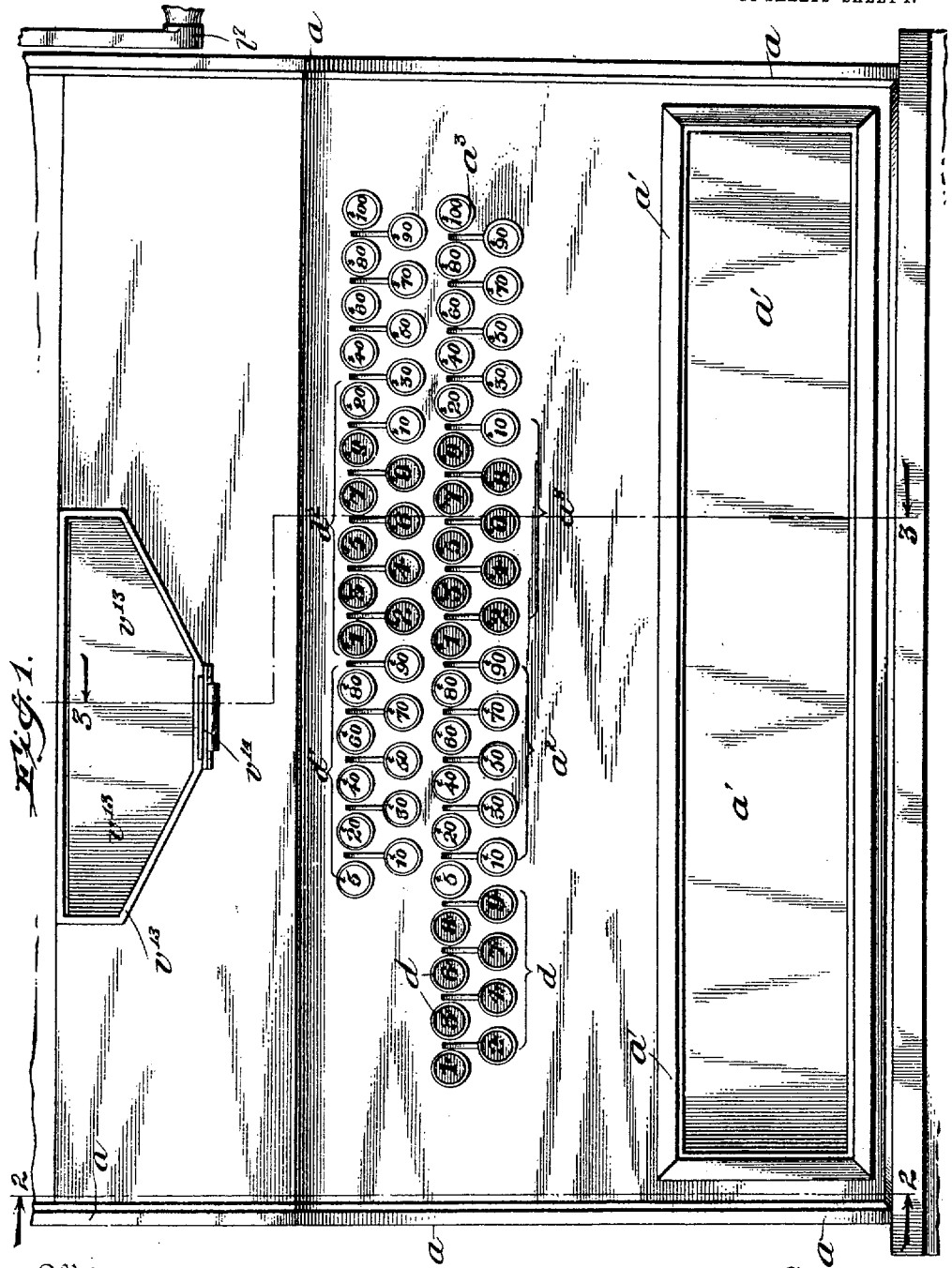

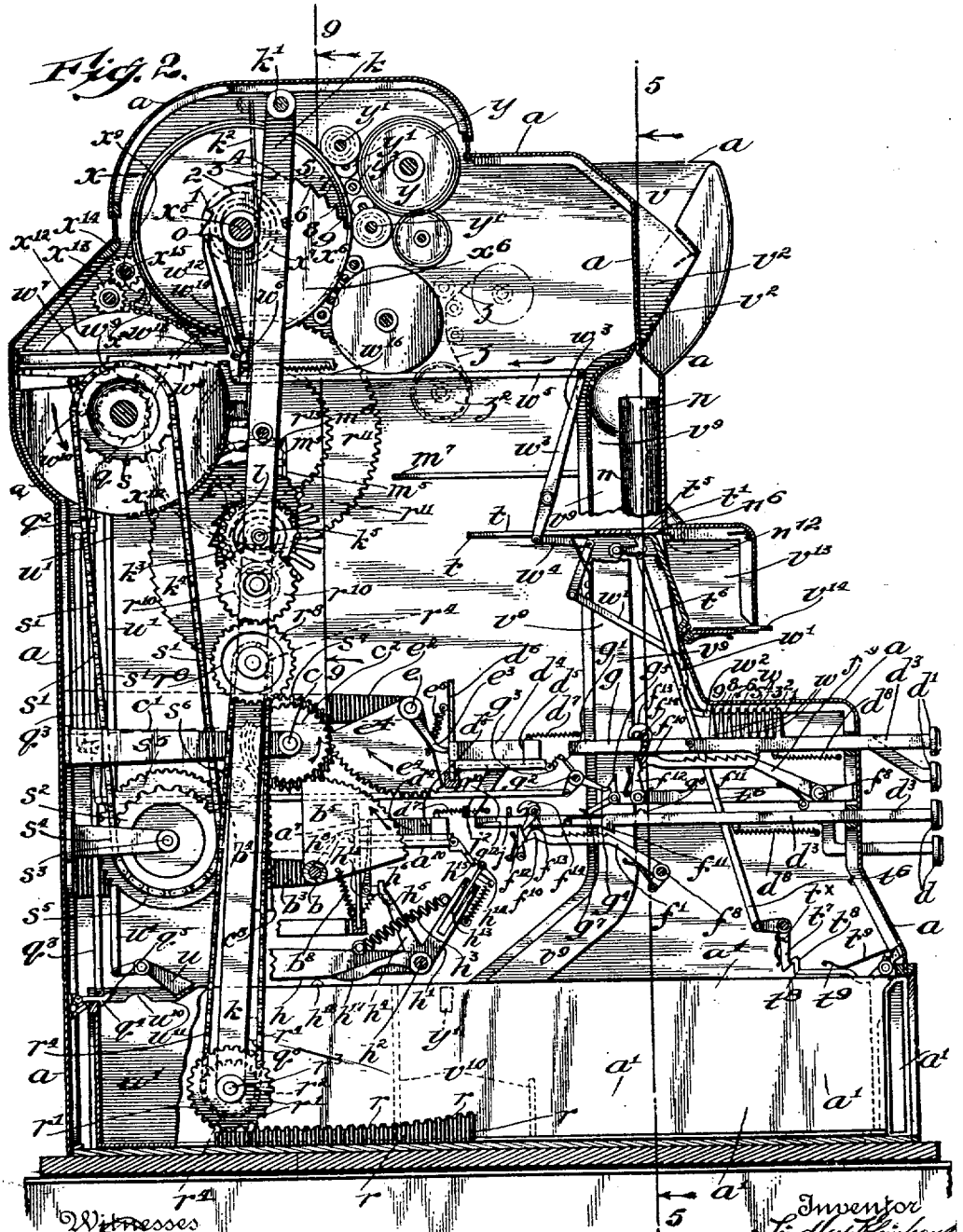

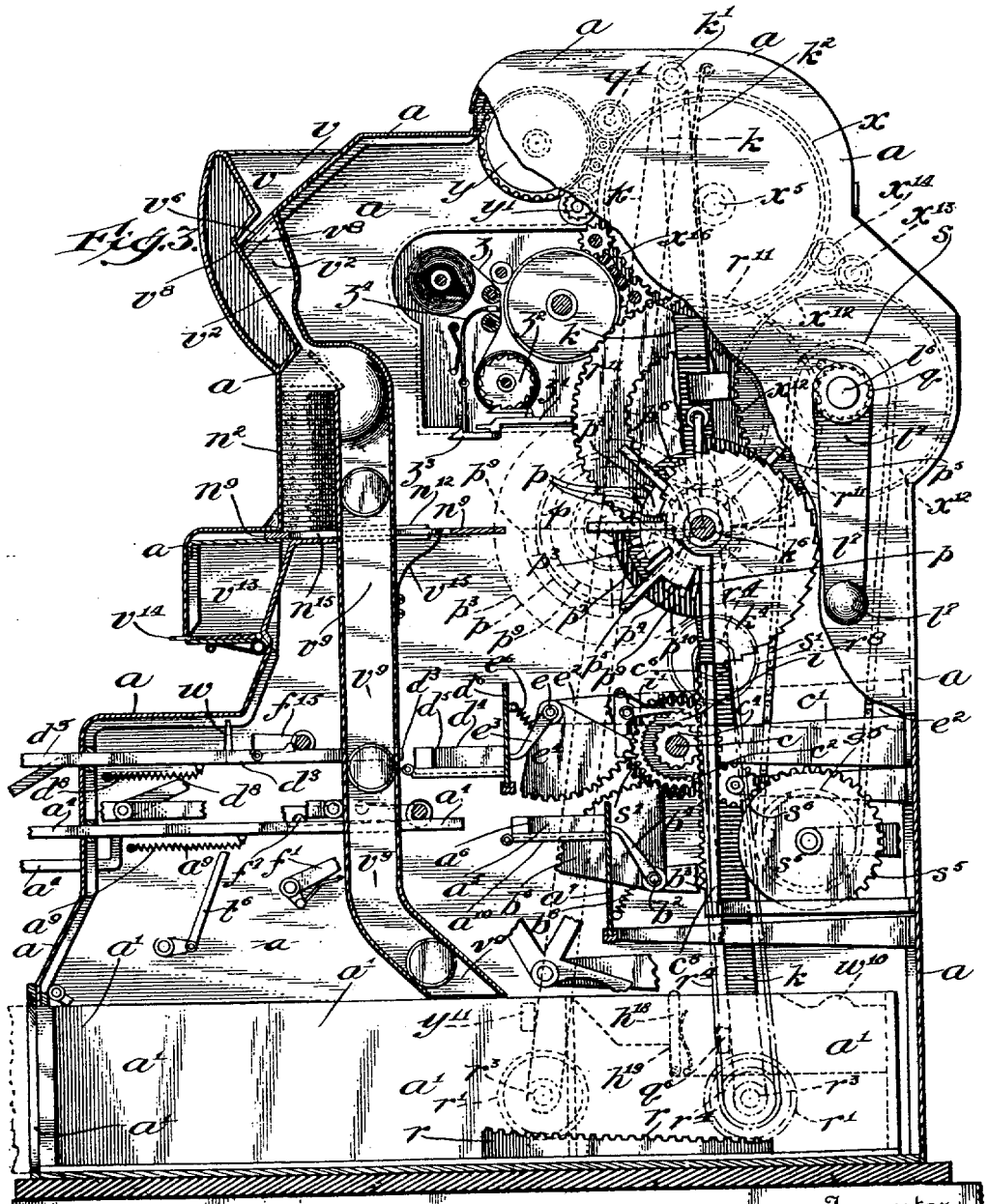

L. KLEINHANS.
CHANGE MAKER AND INDICATOR.
APPLICATION FILED JUNE 29, 1904.
976,129.
Patented Nov. 15, 1910.
14 SHEETS—SHEET 4.
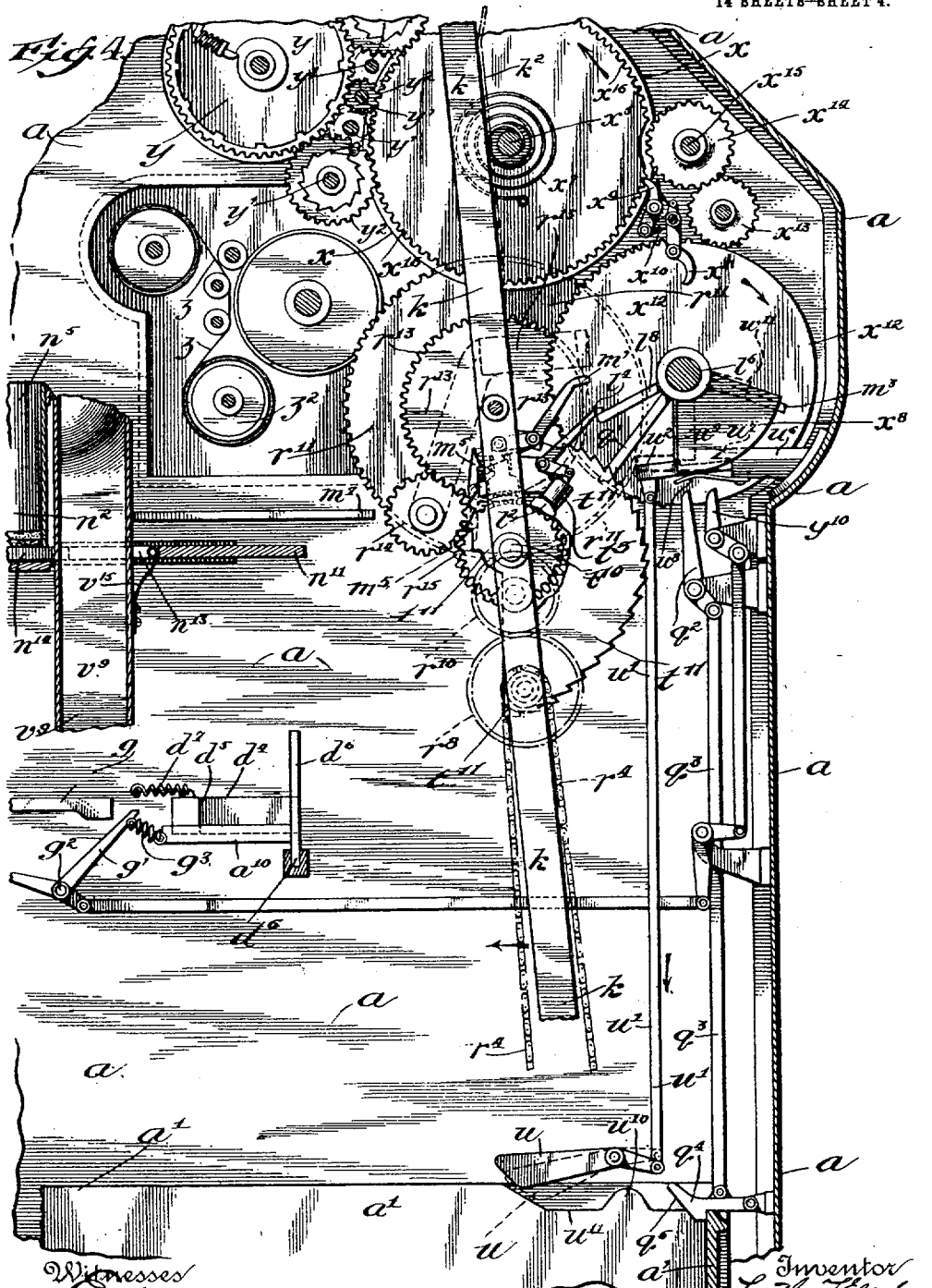

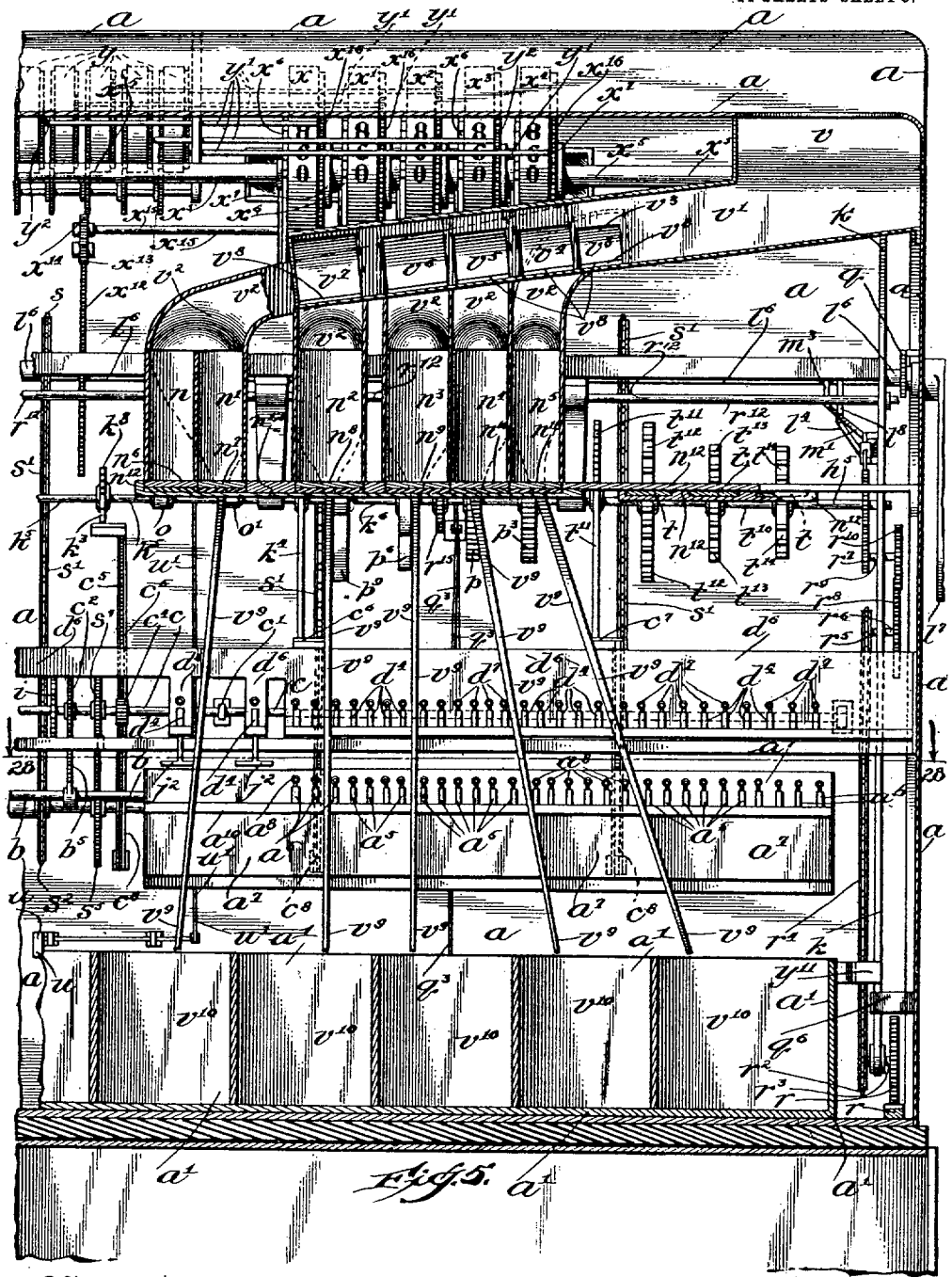

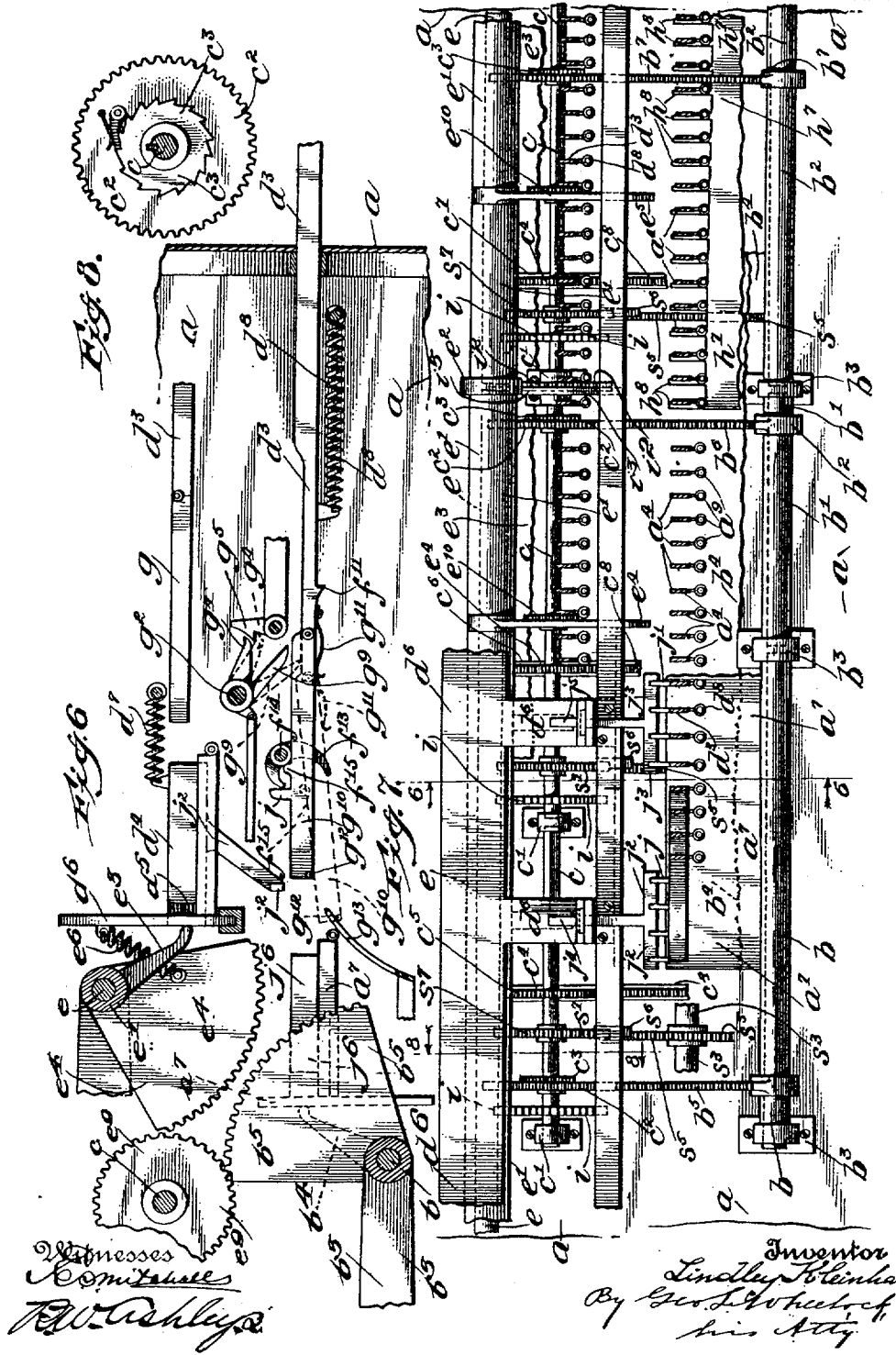

L. KLEINHANS.
CHANGE MAKER AND INDICATOR.
APPLICATION FILED JUNE 29, 1904.
976,129.
Patented Nov. 15, 1910.
14 SHEETS—SHEET 7.
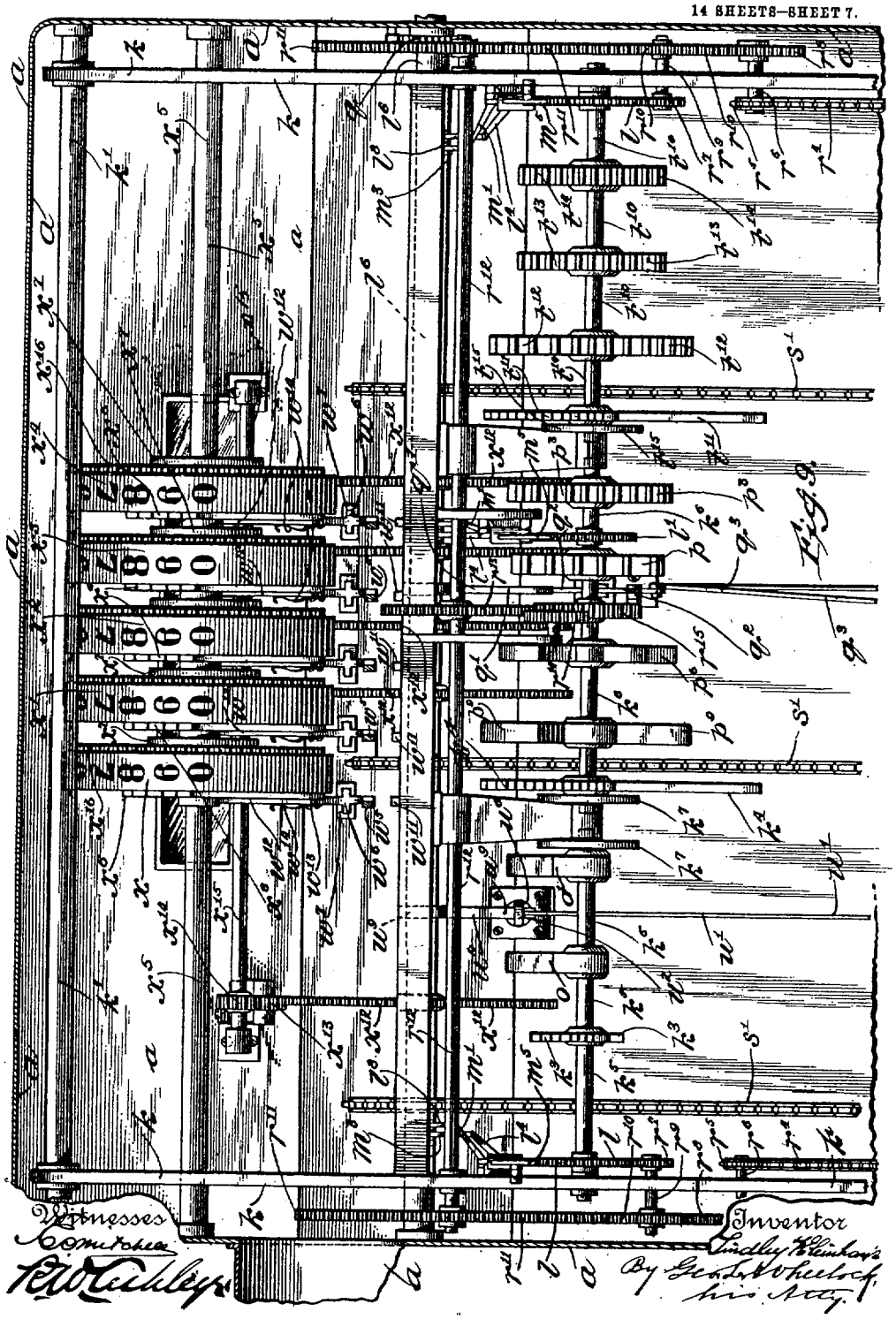

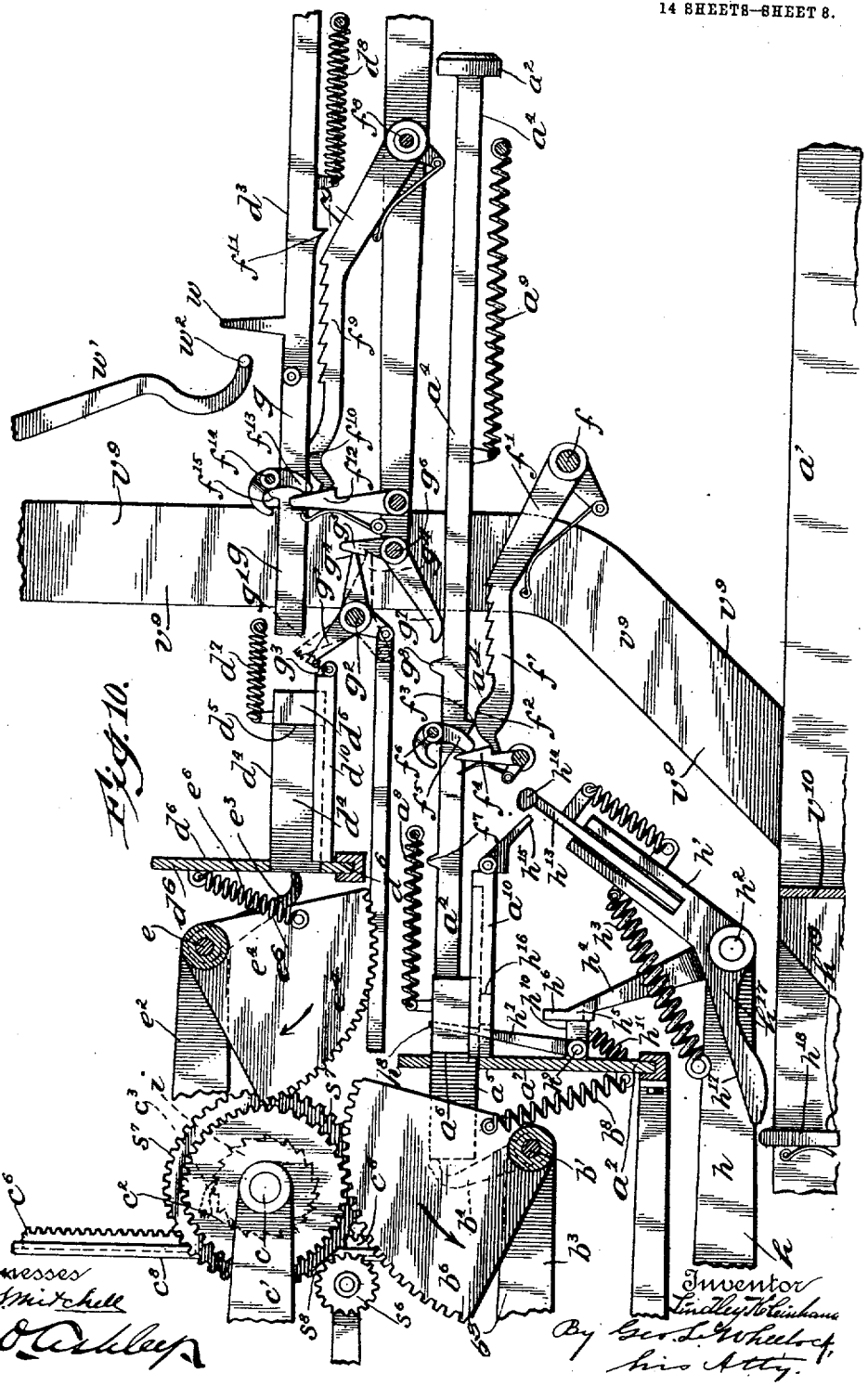

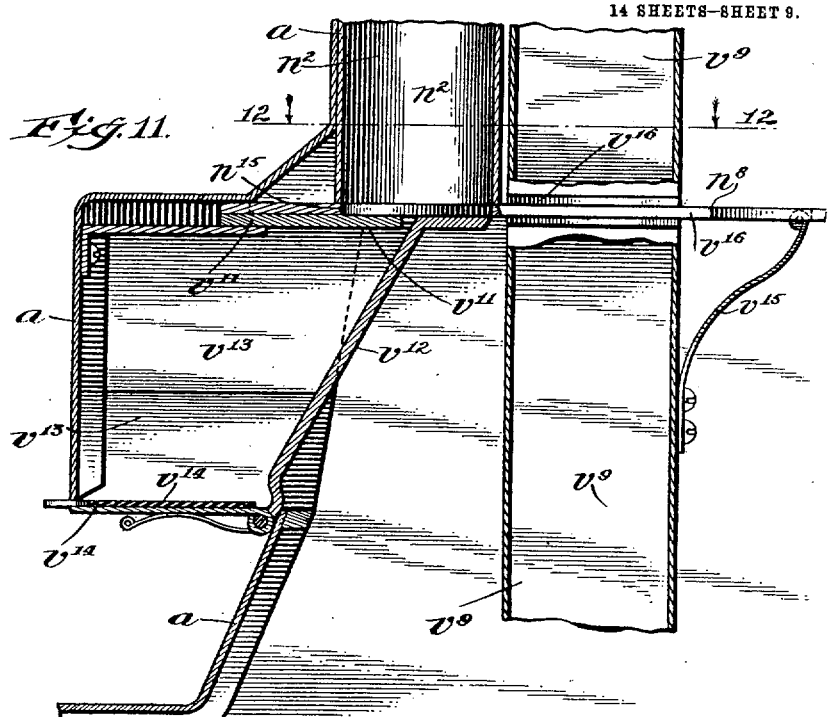
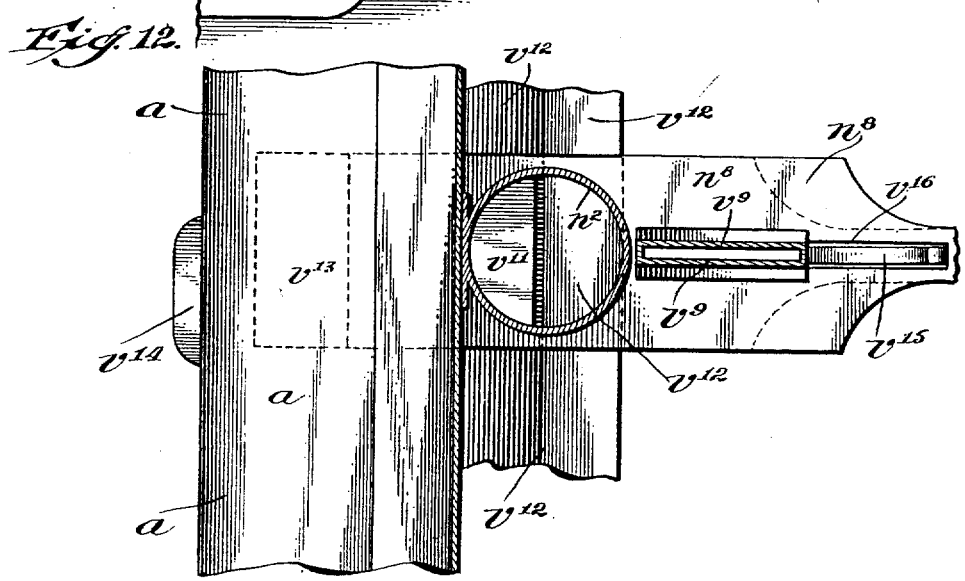

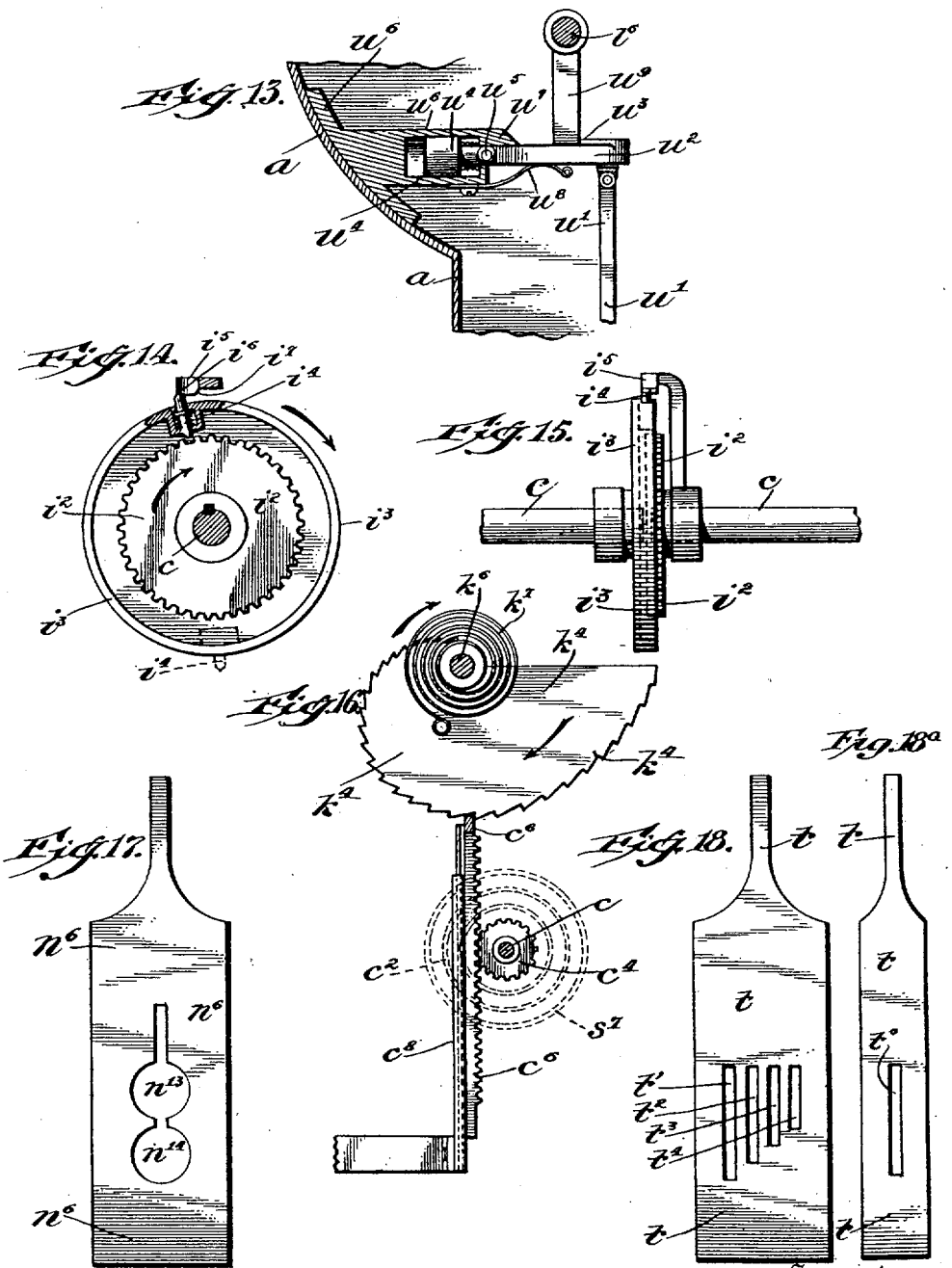

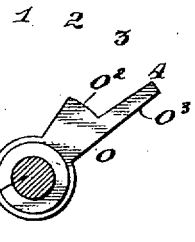
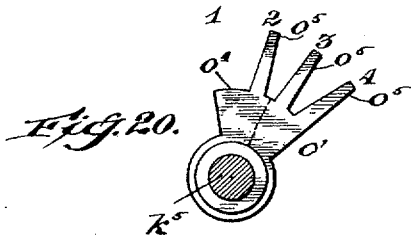
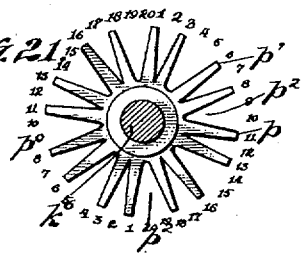
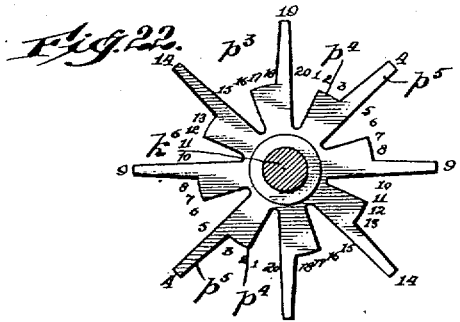
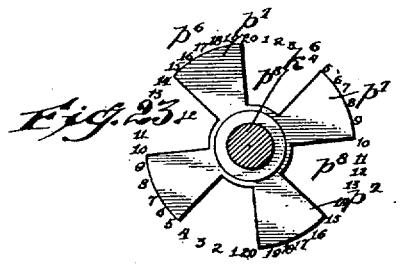
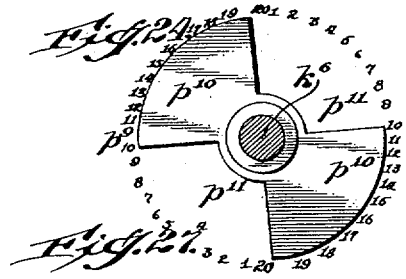
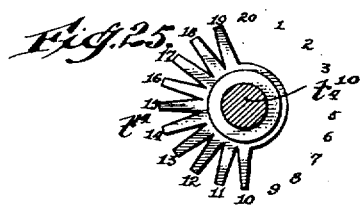
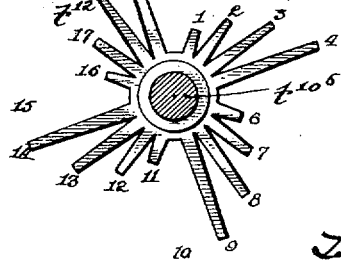

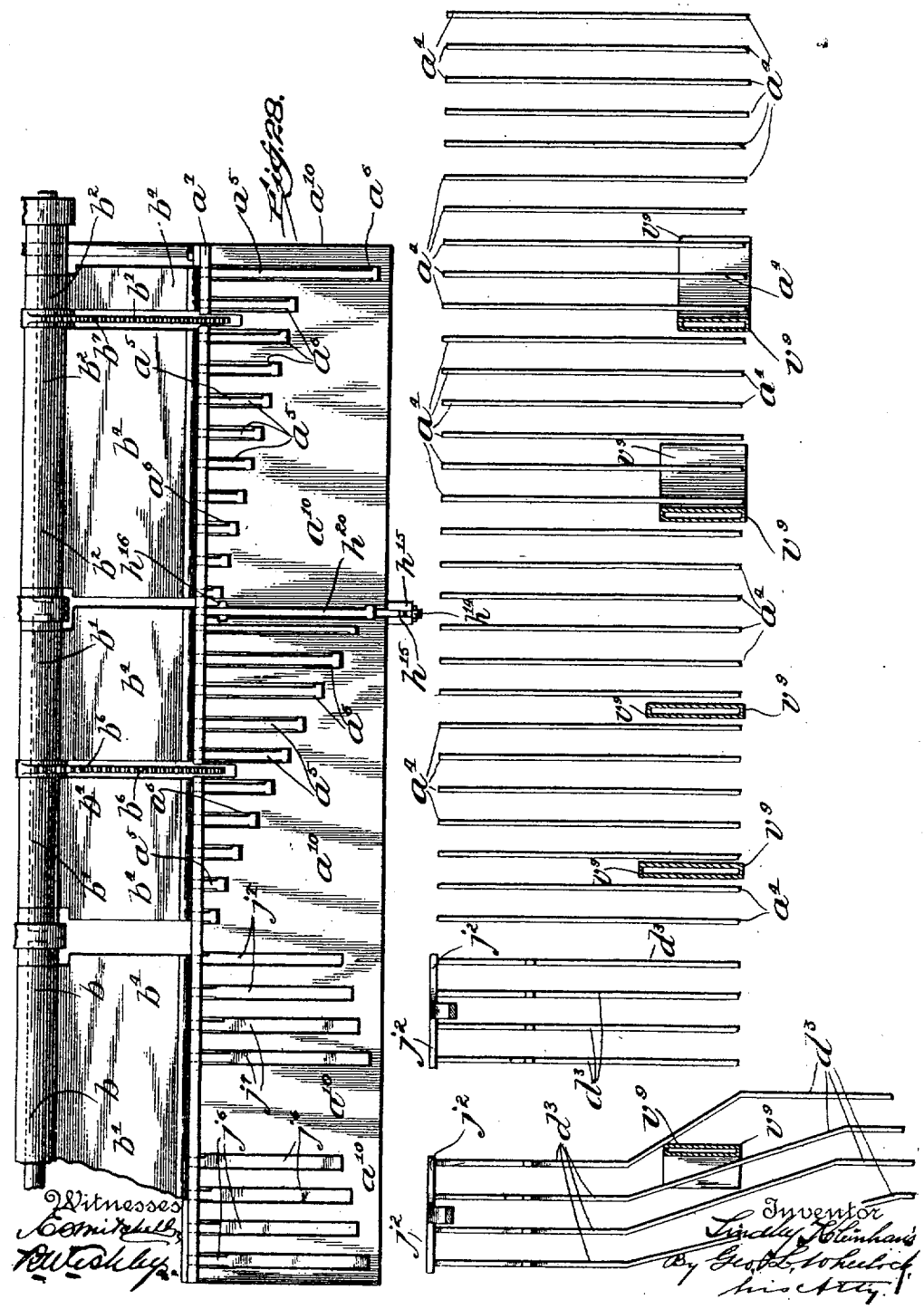

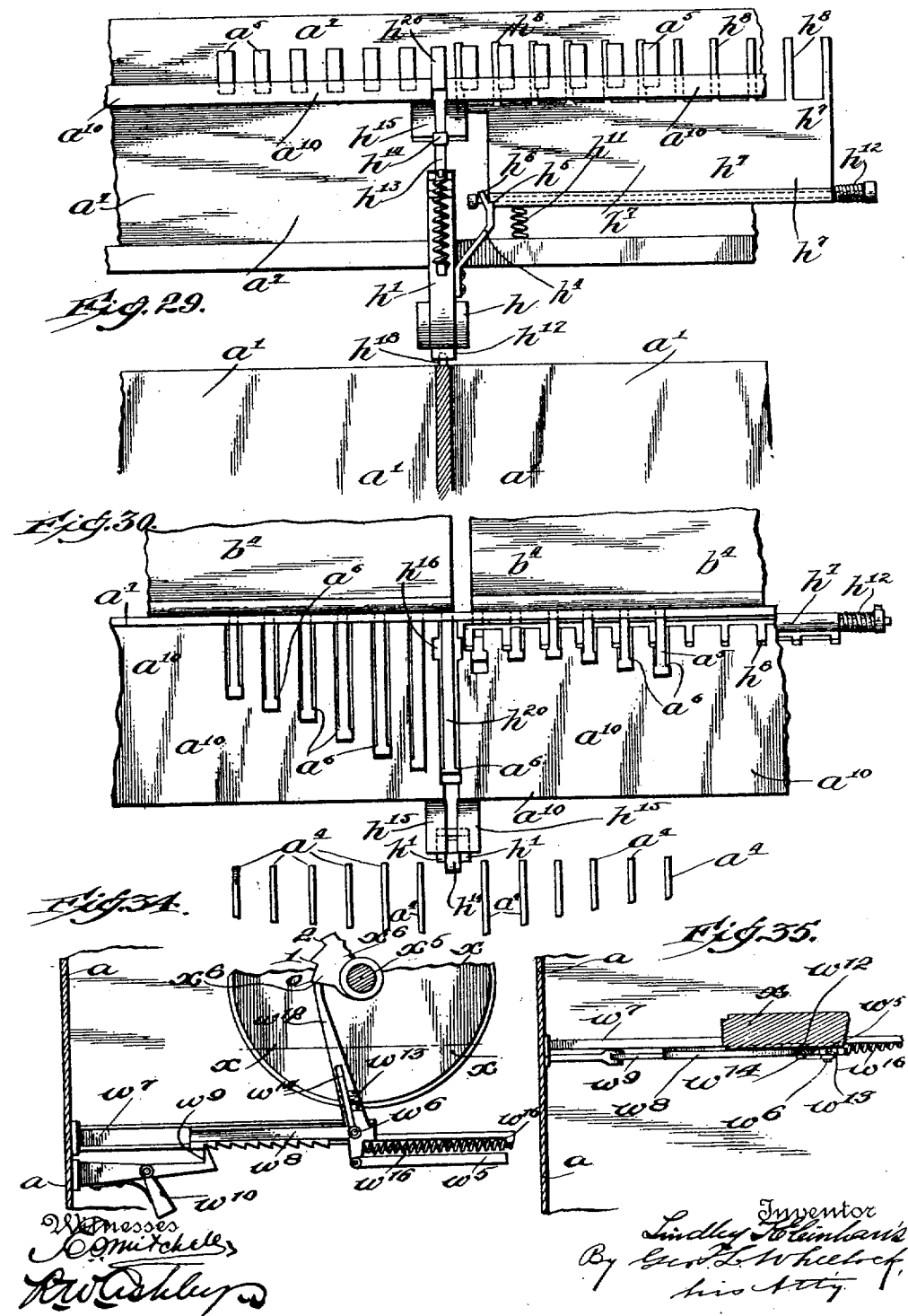

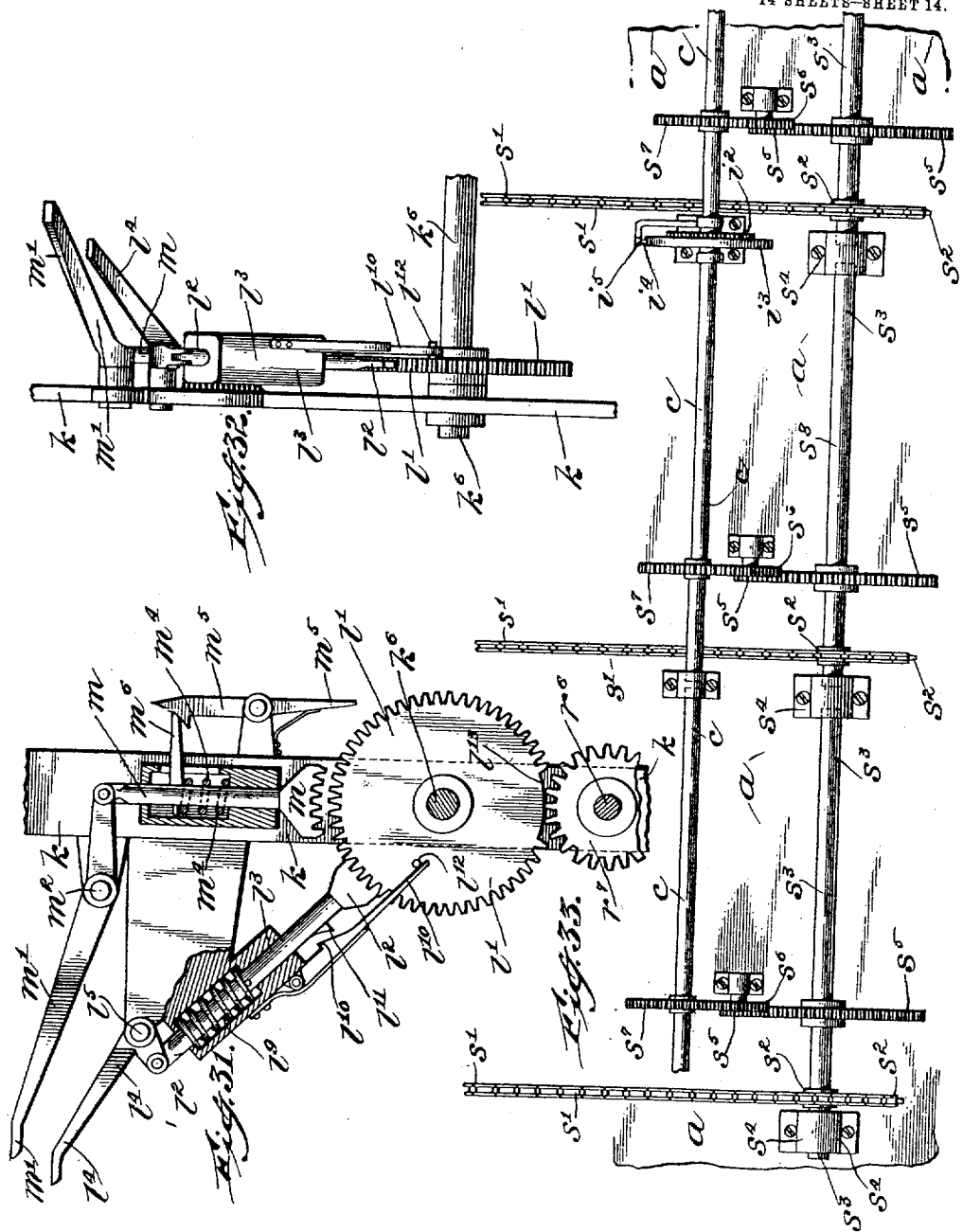

UNITED STATES PATENT OFFICE.

LINDLEY KLEINHANS, OF NEW YORK, N. Y.

CHANGE MAKER AND INDICATOR.

976,129.  Specification of Letters Patent.  Patented Nov. 15, 1910.

Application filed June 29, 1904. Serial No. 214,626.

*To all whom it may concern:*

Be it known that I, LINDLEY KLEINHANS, a citizen of the United States, residing at New York, borough of Manhattan, and State of New York, have invented certain new and useful Improvements in Change Makers and Indicators, of which the following is a specification.

This invention relates generally to such machines as calculating machines, change makers, vending machines and the like, and may be specifically designated a change maker and indicator.

One of the objects of the invention is to provide means whereby, when a purchaser hands in an amount from which the cost of the article purchased is to be subtracted, an attendant may cause the machine to automatically make the correct change.

A further object of the invention is to provide means for indicating the change in bills to be extracted from the drawer.

It will be evident hereinafter that the various objects of the invention may be carried out as a whole in a single machine or that certain objects of the invention may be performed in a machine to the exclusion of others.

These being the more general objects of the invention, the same will be described in detail, with reference to the accompanying drawings which illustrate a suitable embodiment of the invention, and in which:

Figure 1 is a front elevation of the lower portion only of a machine embodying the present invention. Fig. 2 is a vertical transverse section through the machine, on line 2—2, Fig. 1, parts being omitted for the sake of clearness. Fig. 3 is a vertical transverse section of the machine viewed from the opposite side, and passing through a different plane, line 3—3, Fig. 1. Fig. 4 is a vertical central section of a portion of the machine, showing more particularly the devices operated from the crank shaft, and the register. Fig. 5 is a vertical transverse section on the line 5—5, Fig. 2, parts being omitted for clearness of illustration. Fig. 6 is a sectional side elevation of certain parts in detail, showing more particularly the connection between the key-actuated penny device and the fractional currency device. The section is taken on line 6—6, Fig. 7. Fig. 7 is a detail sectional front view of certain portions of the mechanism, more particularly the localizing means or those portions of the mechanism which coöperate with the change distributing mechanism or remainder producing means for producing a remainder in the form of change. Fig. 8 is a detail view of a pawl and ratchet device mounted on the shaft used for re-setting the localizing stops. Fig. 9 is a detail sectional front elevation on the line 9—9, Fig. 2. Fig. 10 is an enlarged detail sectional side elevation of the key-actuated amount-received mechanism and the key-actuated amount-purchased mechanism, together with concomitant parts of the localizing means actuated thereby, this view also showing the eliminator and compensator means, whereby one dollar is eliminated from the dollar side of the change maker, and is converted into a corresponding amount on the fractional currency side. Figs. 11 and 12 are respectively a vertical section of the means for discharging the coins from the coin pockets, and a horizontal section thereof, on line 12—12, Fig. 11. Fig. 13 is a detail sectional view, showing the means for stopping the revolution of the crank. Figs. 14 and 15 are respectively a detail sectional view and a side elevation, showing means for carrying over to the dollar side of the change maker an equivalent amount in fractional currency. Fig. 16 is an enlarged detail sectional side elevation, showing a localizing stop and a setting member. Figs. 17 and 18 are respectively plan views of a coin discharging slide and a slide of the dollar indicating mechanism. Fig. 18ᵃ is a plan view of another slide. Figs. 19 to 27 inclusive are side elevations of the ejector actuators for the slides or ejectors for discharging coin in the denomination, for instance, of pennies, nickels, dimes, quarters and half dollars, and of the actuators for the dollar slides of the dollar indicating mechanism, the shafts being shown in section. Fig. 28 is a horizontal section through parts of the machine on the line 28—28 of Fig. 5, showing the graduations of the spacers actuated by the keys. Fig. 29 is a detail front elevation of the eliminator and compensator device. Fig. 30 is a plan view of the same parts. Figs. 31 and 32 are sectional side and front elevations in detail of the means for locking the change shafts. Fig. 33 is a detail view of parts of the resetting mechanism for the localizing stops of the change maker. Figs. 34 and 35 are detail views of localizing stops used in the register and their allied parts.

For convenience of description and facilitating comprehension, separate sections or portions of the invention will be described in sequence. The subdivisions will be into key mechanism, coin discharging mechanism or remainder producing means, and dollar or paper currency indicating mechanism.

The machine comprises a suitable case $a$, in the lower part of which is located a drawer $a^1$, constituting a receptacle for money or for other articles to be discharged into or contained in the drawer.

*Key mechanism.*—The keys may be arranged as shown in Fig. 1 and comprise, among the amount-received keys, keys $a^2$ for the fractional currency group and keys $a^3$ for the dollar or paper currency group. The amount-purchased keys will be mentioned later. The amount-received keys are each provided with a push rod $a^4$ and these push rods may be of the length shown or they may be of any suitable length depending upon the best results to be obtained. The push rods Figs. 2, 6 and 10 at their inner ends each act upon one of a set or series of differential spacers $a^5$ which are provided with shoulders $a^6$ and are guided in a guide plate $a^7$, suitably fixed in the case $a$. The shoulders are so located that each spacer of any one group may move a different distance from any other spacer of the group. The spacers $a^5$ are provided with suitable retracting means such as helical springs $a^8$ and the push rods are also provided with retracting means such as springs $a^9$. The spacers are guided in their longitudinal movement, upon shelves or guide piece $a^{10}$. The said spacers or the equivalent are for the purpose of actuating or oscillating certain rock-shafts $b$, $b^1$, $b^2$, Figs. 7 and 28 also, there being one rock-shaft for each group of keys. The rock-shafts $b^1$ and $b^2$ are respectively for fractional currency and dollars or multiples thereof, while the rock-shaft $b$ belongs in reality to the penny group of keys which has not as yet been mentioned. The rock-shafts are supported in the bearings of suitable brackets $b^3$ and are provided with rock-arms $b^4$ which may be connected by cross bars extending one from each shaft across the ends of the corresponding group of spacers, or there may be separate rock-arms for each spacer. In Fig. 28, the rock-arms are shown in the form of a rocking plate. It is evident that either one or the other may be employed and a more detailed reference thereto seems to be unnecessary.

Each rock-shaft $b$, $b^1$, $b^2$ is provided with a toothed segment, lettered respectively $b^5$, $b^6$ and $b^7$, and said segments are normally impelled toward the spacers by means of suitable helical springs $b^8$. It will be understood that the springs $a^8$ for retracting the spacers may be dispensed with if desired, as the spring-actuated rock-arms or plates on the rock-shafts will accomplish the return of the spacers. The segments $b^5$, $b^6$ and $b^7$ are employed for the purpose of imparting partial rotation to shafts $c$ which turn in suitable bearings of brackets $c^1$ and which are provided with gear wheels $c^2$ which intermesh with the teeth of the toothed segments, there being one gear wheel for each segment. The gear wheels $c^2$ are loosely mounted on and are connected with the shafts for turning them in one direction by means of a pawl-and-ratchet device such as $c^3$, shown in detail in Fig. 8. These pawl-and-ratchet connections permit the shaft to remain stationary when the gear wheels are moved in opposite directions. Rigidly mounted on each shaft $c$ is a gear wheel $c^4$, each wheel meshing with the rack of a localizing stop. There are three localizing stops $c^5$, $c^6$ and $c^7$, respectively, for pennies, fractional currency and dollars or paper currency. Stationary guides $c^8$ serve for guiding the racks of the localizing stops preferably rectilinearly in their various movements and adjustments, the toothed segments $b^5$, $b^6$, $b^7$, serving, through the medium of the described pawl-and-ratchet connection, to move the racks in one direction. It may well be stated here that the movements of the racks and their localizing stops by means of the said toothed segments carry the same to minuend position.

For obtaining amount-purchased results, the machine is provided with a group of penny keys $d$, a group of fractional currency keys $d^1$ and a group of dollar keys $d^2$, and these keys are provided with push rods or equivalent actuated devices $d^3$, shown more clearly in Fig. 10. Corresponding with the spacers of the amount-received keys are additional spacers $d^4$ for the amount-purchased keys, there being illustrated in the drawings two sets or groups of amount-purchased spacers above the amount-received spacers, while the amount-purchased spacers for the penny group of keys are located below and to one side of the two said upper groups for convenience. The oscillatory shaft and concomitant parts operated by the penny spacers have been described in connection with the amount-received keys and their devices for convenience, as the drawings indicate the penny keys alongside the amount-received keys. The additional spacers $d^4$ of the amount-purchased keys are provided with shoulders $d^5$ and are guided or spaced from the guide plate $d^6$ in similar fashion to the spacings of the shoulders of the amount-received spacers $a^5$. The spacers $d^4$ may be provided with retracting springs $d^7$ and the push rods $d^3$ with suitable retracting means such as springs $d^8$.

The rock-shaft and parts actuated by the spacers of the penny keys have been described so that mention need only be made of rock-shafts $e$, $e^1$, respectively for fractional currency and dollars and multiples thereof in the amount-purchased portion of the machine. These rock-shafts are mounted in suitable stationary brackets $e^2$ and are provided with rock-arms or plates $e^3$. In the case of rocking plates each plate extends across the inner ends of its corresponding group of spacers and in the case of rock-arms, there is one arm for each spacer, as will be understood. Mounted on the rock-shafts $e$, $e^1$, respectively, are toothed segments $e^4$, $e^5$, Figs. 2 and 6, which segments are impelled toward the spacers by means of suitable tension springs $e^6$ which hold the ends of the rock-arms or rock-plates $e^3$, as the case may be, in contact with the actuating ends of the spacers. Loosely mounted on two of the shafts $c$ are gear wheels $e^9$ which mesh with the toothed segments $e^4$ and $e^5$ so that, when the segments are positively actuated by the spacers, the said shafts will be turned in one direction through the medium of a pawl-and-ratchet connection $e^{10}$. It will be observed that no segment for the penny group of keys corresponding with the segments $e^4$, $e^5$ for the fractional currency and dollar group of keys in the amount-purchased portion of the machine is here shown, nor is any necessary, for the reason that the penny localizing stop is only moved from one extreme position to another and is not moved to an intermediate position such as is the case in subtraction, with the fractional currency or dollar group of keys, as these effectuate the movement of the corresponding localizing stops to minuend position and then move them, through a space corresponding with the subtrahend, to remainder position. By stating that the penny localizing stop is moved only between two extreme positions, is meant that it is moved from zero to one or two or three or four, and is not returned by the key which so actuates it. The term "localizing means," as used in the claims, is intended to indicate racks or a rack, and stops or a stop, and their equivalent, which set and determine the position of a change controller, and which are engageable with or disengageable from the change controller, and receive both the adding and subtracting movements. The localizing means in its broadest sense also includes a set of keys and translating devices whereby the separate movements of the keys are concentrated upon a single rack or its equivalent, so that variable movements may be imparted to such rack from the set of keys.

As it is desirable that each key have the same amount of inward movement each time it is operated to complete its full actuation, means are provided for preventing the return of the key unless it has been pushed in to its full extent. To accomplish this, there may be provided as shown in Figs. 2 and 10 in particular a fixed shaft $f$ on which are mounted spring-pressed toothed dogs $f^1$ for the amount-received keys, there being one dog for each push rod. Each dog is preferably provided with a hump or its equivalent $f^2$, and each push rod is provided with a tooth $f^3$ which is adapted to strike the hump as well as to engage the teeth of the dog. A spring-pressed catch $f^4$ for each dog $f^1$ is provided, said catch having a tendency to engage the toe or extreme end of its corresponding dog. Suitable pivoted gravity trips $f^5$ are provided for the spring-pressed catches $f^4$, which trips are normally engaged with the catches, and are hung on a suitable fixed shaft $f^6$. Each push rod $a^4$ is provided with a trip-actuating nose or lug $f^7$, the function of the noses being to engage and operate the trips. The amount-purchased push rods are correspondingly compelled to be pushed in to their full limit before they can return, similar means being preferably employed, which means may comprise a fixed shaft $f^8$ on which are pivoted spring-pressed toothed dogs $f^9$ provided with humps $f^{10}$. Each push rod $d^3$ is provided with a tooth $f^{11}$, and pivoted gravity trips $f^{13}$, which engage the spring-pressed catches $f^{12}$, are mounted upon a shaft $f^{14}$. Trip-actuating noses or lugs $f^{15}$ are located on the push rods.

The action of the compulsory push-in device is as follows: If a key be pushed in but partially the tooth on its push rod will engage the teeth of the corresponding toothed dog, which teeth act as detents to the push rod and preclude its return, but by reason of their inclinations, they permit the push rod to be pushed in to its full limit. When the push rod is pushed in as far as possible, its tooth engages with the hump of the spring-pressed dog and causes the same to snap into locking engagement with the spring-actuated catch, thus securing the dog and its teeth out of the path of movement of the tooth on the push rod so that the push rod may return immediately, under the actuation of its spring. The return of the push rod effectuates, by the action of its lug or tooth, the movement of the tripping end of the trip, to cause its other end to press on the catch and disengage it from the dog, thus permitting the same to return to position, under the actuation of its spring. This is only one way which may be resorted to for accomplishing the desired end and it is to be understood that the invention is not limited to the construction shown.

If the amount of the purchase corresponds with the amount handed over by the customer, the amount-received push rods are not to be operated. It is evident that as in this case no change is desired, only the amount-purchased keys are to be operated. This being the case, the register or adding machine to be subsequently described but forming no part of the present invention, is only brought into action, through the medium of the amount-purchased keys, the push rods of these being so constructed that they do not then act on their spacers. To this end, suitable means may consist of a pivoted idler-part $g$ at the inner end of each push rod $d^3$, which is simply switched or pressed to one side automatically as the key is pressed in. Normally, in the line of longitudinal motion of each amount-purchased push rod, there is located a suitable deflecting arm or its equivalent $g^1$. The normal position of this arm is indicated in dotted lines in Fig. 10, and its inclination or position is such that as the idler-part $g$ strikes the same, it is simply moved or switched to one side. Similarly acting idler-parts and deflecting devices would be arranged for each key rod. The deflecting arms $g^1$ are arranged on an oscillatory shaft $g^2$, suitably actuated from the hand-crank of the machine for the purpose of re-setting them. A spring, or springs, $g^3$ connect the deflecting arms $g^1$ with guide shelf $d^{10}$ of the spacers. The tendency of this spring, or springs, is to draw the deflecting arm out of the path of the idler-part of a push rod. The deflecting arms $g^1$ may be formed as separate deflecting arms or they may be formed as one plate extending across the inner ends of the push rods, in which case, the plate is formed as a rocker with a tooth $g^4$ engaged by means of a pivoted catch $g^5$ mounted rigidly on an oscillatory shaft $g^6$ located in suitable bearings and provided with a trip nose $g^8$ on the amount-received push rods. It will be understood that the trip extension may be a plate or it may consist of two arms connected at their outer extremities by means of a cross-bar that can be engaged by the trip nose. The deflecting plate is removed from the path of the idler-parts, as shown in full lines, upon the actuation of any amount-received key. The oscillating shaft $g^2$, on which are arranged deflecting arms $g^1$, Fig. 10 extends across the push rods of the penny keys but the said deflecting arms are here omitted, as they are unnecessary. A penny push rod deflecting arm or portion $g^9$ extends from the shaft $g^2$ and all of the penny push rods are arranged so as to be engaged by the outer edge thereof. In the case of the idler-portions $g$, the deflecting arm $g^1$ acts upwardly, but, in the case of the penny push rods, the deflecting arm $g^9$ acts in opposite direction against pivoted idler-portions $g^{10}$, formed as parts of the penny push rods. The idler-portions of all the push rods are preferably formed with rule-joints, which preclude bending of the idler-portions in two directions. Said idler portions $g^{10}$ are held in alinement with the main portions of the penny push rods by means of suitable springs $g^{11}$. At the outer end of each of the penny push rods, or rather, their idler-portions, are pins $g^{12}$, which, when their said push rods are pushed inwardly, are adapted to come in contact with a slotted inclined plate $g^{13}$, the pin simply riding on the under surface of the plate, thus bending the idler-portion downwardly so that there will be no actuation of the spacers of the penny keys. Normally, deflecting portion or arm $g^9$ is thrown downwardly into the position shown in dotted lines in Fig. 6. In this position of the deflecting arm, the idler-portions of the penny push rods are held in the position shown in dotted lines in said figure so that as any penny push rod is pushed inwardly and the path of its idler-portion moved past the deflecting portion $g^9$, the said idler-portion will be prevented from returning by the contact of the pin $g^{12}$ with the plate $g^{13}$; and it might be found that the plate $g^{13}$ can be dispensed with by slightly altering the deflecting portions. In the dotted line position of the idler-portions of the penny push rods the register only will be actuated. The idler portion $g^{10}$ of the penny push rods will, under the actuation of their springs $g^{11}$, assume the alined position shown in full lines when the pivoted catch $g^5$ has been unlocked from the tooth $g^4$ by the actuation of any of the amount-received keys. This is necessary when change which includes pennies is to be delivered.

The spacers of the fractional currency group of keys, whether amount-received or amount-purchased, are arranged so that the localizing stops will have a corresponding position. In addition to the twenty positions effectuated thereby on the localizing stop, means are provided for effectuating twenty positions of the same localizing stop so that this localizing stop may have forty possible positions. The localizing stop referred to is the fractional currency stop $c^6$. To effectuate this extra spacing movement, devices shown in Figs. 10, 29 and 30 are provided, suitably consisting of a stationary bracket $h$, a slide-way arm $h^1$, pivoted at $h^2$ to said bracket, a spring $h^3$ acting on the said arm, a controller arm $h^4$ provided with a shoulder $h^5$ and with a cam-piece or inclined finger $h^6$. There is also an eliminator and compensator plate $h^7$ provided with the eliminators $h^8$ in the form of fingers or blades and pivots $h^9$ for the plate $h^7$. The plate $h^7$ is provided with a detent $h^{10}$ and is acted upon so as to be projected forwardly by means of a suitable tension spring $h^{11}$. There are a number of eliminators $h^8$ corresponding with the number of dollar spacers. A spring retracted finger $h^{13}$ is guided in the arm $h^1$ and is provided with a head $h^{14}$ which is adapted to ride over a hinged inclined slotted shoe $h^{15}$, said shoe being formed as an extension of the spacer shelf which is also slotted and is provided, as shown, with a hole $h^{16}$, through which the head $h^{14}$ is adapted to pass as hereafter described. A re-setting arm $h^{17}$ is formed as an extension of the arm $h^1$ and is adapted to coöperate with a spring-pressed contact $h^{18}$ mounted on the drawer $a^1$. The drawer is provided with a stop shoulder $h^{19}$ against which the contact is pressed by its spring. See also dotted lines in Fig. 3.

The eliminator and compensator devices operate as follows:—Say, $5.00 for instance, has been received: The five dollar amount-received key is pressed against its spacer and this causes the shoulder $a^6$ on the said spacer and behind which one of the eliminators $h^8$ is located, as seen from Fig. 30, to rock the eliminator and compensator plate $h^7$ on its pivot and withdraw the detent $h^{10}$ from engagement with the shoulder $h^6$. Immediately the eliminator and compensator plate is released the spring $h^{12}$ thereof presses it to one side and causes the spaces between the eliminator blades $h^8$ to exactly register with the spacers in such way that if, in this position of the eliminator plate, an additional dollar key rod $a^4$ be operated, its spacer will not act thereon as appears from Fig. 10. As the localizing stop of the dollar keys is arranged to space for each movement so also is the eliminator or compensator plate of such thickness that the spacer which actuates it will move the dollar localizing stop one space less than the space indicated on the depressed key which, in the example given, is the five dollar key. In this case, the localizing stop actuated will indicate four dollars instead of five. It is necessary to do this for the prupose of obtaining fractional currency, and this dollar which is eliminated upon the depression of a dollar key is compensated for and converted, so to speak, into an equivalent in fractional currency, amounting to twenty spaces in the fractional currency portion, by reason of the release of the controller arm $h^4$ from the detent $h^{10}$ of the eliminator and compensator plate. This will enable the spring $h^3$ to rock the arm $h^1$ on its pivot and carry the head $h^{14}$ on finger $h^{13}$ up the inclined shoe $h^{15}$, the finger passing through its slot and through the slot in the corresponding shelf. This action distends the spring which tends to retract the finger $h^{13}$. As the head $h^{14}$ strikes an additional or twenty space spacer $h^{20}$, for fractional currency, it presses this in to its full limit and this actuates the parts of the fractional currency portion of the machine which carry the corresponding localizing stop through a distance of twenty spaces. When the twenty space spacer $h^{20}$ reaches its extreme limit of inward motion, the head $h^{14}$ reaches the hole $h^{16}$ in the spacer shelf and the spring of the finger $h^{13}$ immediately draws the head through said hole, and below the shelf. The rock-arms may then be returned to their former position. This is accomplished by means of the said spring-pressed contact $h^{18}$ which, as the drawer $a^1$ is pushed in, is stopped by the shoulder $h^{19}$ thereon and comes in contact with the re-setting arm $h^{17}$, thus returning the parts to their normal position. On the return movement of the controller arm $h^4$ its inclined finger or cam piece $h^5$ comes in contact with the detent $h^{10}$ of the eliminator and compensator plate $h^7$ and forces the same back against the action of its spring $h^{12}$, thus re-setting the eliminators in normal position as shown in Figs. 10, 29 and 30.

Suitable pawls and ratchets are provided Figs. 3 and 7 for steadying the rack operating shafts $c$ and the ratchets may be indicated by $i$ and the pawls by $i^1$. These pawls and ratchets have an additional function, or rather, the pawl and ratchet for the dollar portion of the machine has an additional function, which will presently appear. It will be remembered that the five dollar key has been pushed in and that one dollar has been converted into twenty spaces in the fractional currency portion of the machine. This is to enable change in fractional currency to be made, but it is necessary that this dollar be re-converted in the dollar portion of the machine, that is to say, that suitable means be provided whereby the fractional currency shaft $c$ will act on the dollar shaft $c$ and cause the movement of the localizing stop thereof for a distance of one space, thus adding a dollar on the dollar side of the machine. Now, if an amount-purchased key, say a two dollar key, be pushed in, the dollar localizing stop is in position to indicate that three dollars may be extracted from the drawer. Furthermore, the parts are in position so that if change less than a dollar is desired, this may be obtained by pushing in the fractional currency key. If this be done, then the dollar which was before added on the dollar side of the machine is subtracted, because change in even dollars is not desired. To accomplish this, means shown in Figs. 7, 14 and 15 may be provided, and the additional function of the pawl and ratchet on the dollar localizing shaft will be understood. A toothed wheel $i^2$ is fixed on the inner end of the dollar shaft $c$ and a carrier disk $i^3$ is fixed on the adjacent end of the fractional currency shaft. The disk $i^3$ is provided with a rim in which is suitably mounted a spring retracted pin $i^4$, having beveled ends, the inner pointed or beveled end of the pin being adapted to take between the teeth of the toothed wheel $i^2$ while the outer end thereof is adapted to coöperate with a stationary presser $i^5$ provided at its ends with inclines $i^6$ and $i^7$ respectively. The additional or twenty space spacer $h^{20}$ has moved the fractional currency shaft $c$ half a revolution, carrying the spring retracted pin $i^4$ from the position shown in dotted lines in Fig. 14 to twenty space position. The full line position shown corresponds with nineteen spaces and the dotted line position with blank. At space nineteen position the spring retracted pin engages the incline $i^6$, and the action of the engaged surfaces is such that the pin is pressed in between the opposite teeth, and as the disk $i^3$ and said pin move toward the twenty space position corresponding with one dollar, the inner end of the pin by its engagement with the toothed wheel $i^2$ carries said toothed wheel positively forward in the direction of the arrow until the beveled outer end of the pin comes in contact with the other incline $i^7$, which permits the pin to be retracted away from the toothed wheel, the latter being carried forward to its full single space position by the additional impulse imparted thereto by the beveled tooth of the pawl $i^1$ acting on the ratchet $i$ on the dollar shaft. It will be evident that the pawl and ratchet simply completes the spacing movement, and some such means or its equivalent are necessary, as, when the outer end of the pin is engaged with the incline, $i^7$, its inner end is disengaged from the toothed wheel and cannot positively move it its full distance.

The penny push rods are, as shown in Fig. 6, provided with striker lugs $j$, $j^1$, the lugs $j$ being for the push rods of the one, two, three and four penny keys, and lugs $j^1$ for the six, seven, eight and nine penny keys. The devices actuated by the said lugs are for the purpose of subtracting from the amounts on the fractional currency side of the machine. There are two subtracting heads $j^2$ and $j^3$, respectively for the push rods and their lugs $j$, and for the push rods and their lugs $j^1$. The subtractor head $j^2$ subtracts five cents from the fractional currency side when actuated, and the head $j^3$ subtracts ten cents therefrom. Two spacers $j^4$, $j^5$, respectively are actuated by the five cent and the ten cent subtractor heads. The push rods of the penny keys act directly upon the spacers $j^6$, $j^7$, spacers $j^6$ being for the push rods of the one, two, three and four penny keys, and spacers $j^7$ being for the six, seven, eight and nine penny keys. Whenever a penny push rod is actuated, five cents or ten cents is subtracted from the fractional currency portion of the machine, and pennies added corresponding to the difference between the number indicated on the key depressed and five cents, or ten cents; that is to say, when a two penny key, for instance, is pressed in, three pennies will be dropped in the manner hereinafter to be described in connection with the change making mechanism. At the same time that the two penny key is pressed in five cents are subtracted from the fractional currency portion of the machine.

Irrespective of visible results obtained by the machine, it will be useful in an understanding of the operation to know that the amount-received keys are each in reality means for carrying the localizing stops to a position indicative of minuend position, and that they would be minuend keys in case the invention is embodied in a subtracting machine pure and simple. Also, that the amount-purchased keys are subtracting keys to subtract from the result produced in the machine by the minuend keys; for example, suppose it is desired to subtract fifty from seventy-five, then the minuend keys seventy and five, or seventy-five—if a key of the value of seventy-five be provided—are pushed in, thus bringing the localizing stop $c^6$ which is arranged to space a distance corresponding with five units at each actuation, to minuend position. The subtracting key number fifty, is then pressed which reverses the direction of motion of the localizing stop and brings the same to remainder position, the space eliminated corresponding with the subtrahend so that there are but five spaces remaining, indicative of twenty-five units. The same method of actuation of the localizing stops described for subtracting is carried out in connection with the other localizing stop $c^7$. It is evident that the principle of the invention may be carried out by spacing the stops differently from the manner shown.

*Coin discharging mechanism.*—By means of the mechanism heretofore described it is possible through the medium of the coin discharging mechanism to obtain variable amounts of change, as it is simply necessary to so construct the coin discharging mechanism that parts thereof will coöperate with the localizing means. Suitable means for discharging coin are shown in Figs. 2, 3, 5, 9 and 19 to 24. The means shown comprise a movable or swing change-frame $k$, mounted on a pivot-shaft $k^1$ and under the constant tension of a spring $k^2$. The tendency of the spring $k^2$ is to push the frame $k$ forward in the same direction as the opening movement of the drawer $a^1$. As no means is shown for making change in bills, the means for indicating the bills to be extracted from the drawer will be described later and not in connection with the coin discharging mechanism, and, therefore, it will be clear that in connection with the coin discharging mechanism no part of the dollar indicating mechanism excepting such as is incidental to the coin discharging mechanism is to be understood. For the purpose of coöperating with the localizing stops $c^5$, $c^6$, for the key-actuated penny mechanism and the fractional currency mechanism respectively, there are provided two cam shaped stepped setting members $k^3$, $k^4$, respectively, for pennies and fractional currency, these members being rigidly mounted on change shafts $k^5$, $k^6$, respectively. These shafts are spring actuated, being subjected to the tension of coiled springs $k^7$, suitably fixed at one end, and at the other end connected with the shafts to act like clock springs. As the localizing stop $c^6$ of the fractional currency portion of the machine is, in the present instance, arranged to move forty spaces, the setting member thereof is arranged with forty teeth, stepped in such way as that the distance of the teeth from the shaft progresses successively from the point nearest the shaft to the point most remote from the shaft on which the setting member is located, so that there will be a position of the setting member corresponding with each position of the localizing stop. The spring tends to turn the setting member $k^4$ in the direction of the arrow, Fig. 16, when the shaft on which it is mounted is released or unlocked, as will be hereinafter described; and, when released the tooth on the setting member corresponding in position with the position of the localizing stop, which may then be set, is brought against the stop so that the setting member comes to rest and the parts movable therewith are set in position. It will be understood that the setting member $k^3$ on the penny shaft will have a number of teeth corresponding with the number of pennies desired to be obtained, which is, one penny or two pennies or three pennies or four pennies. Consequently, the setting member $k^3$ will have four teeth to correspond with the four possible positions of the localizing stop $c^5$ which controls it. The parts controlled by the said setting member $k^3$, $k^4$ comprise coin-ejector actuators to be described hereinafter. These coin-ejector actuators are shown in detail in Figs. 19 to 24 inclusive.

Referring now to Figs. 4, 31 and 32, the means for locking the change shafts $k^5$, $k^6$ and the parts mounted thereon and causing rotation when required will be described. Toothed wheels $l$, $l^1$, or rotatory clutch members are arranged on the change shafts $k^5$, $k^6$. There are corresponding locking devices for each of the toothed wheels $l$, $l^1$, and the parts controlled thereby and the locking device for only one toothed wheel or clutch member will be described. The movable or swing change frame $k$ is provided with a suitable bracket in which is mounted a reciprocating clutch member $l^2$, the shank of which moves in a guide $l^3$. On the same bracket is pivoted a bell-crank $l^4$ at $l^5$, said bell-crank being adapted to be actuated for the purpose of releasing the normally engaged clutch members. The releasing means preferably comprise the crank-shaft $l^6$ provided with a hand-crank $l^7$ and carrying a tappet $l^8$, the outer end of which is adapted to strike the free end of the bell-crank lever $l^4$. A spring $l^9$ acts on the reciprocating clutch member $l^2$ tending to engage the teeth thereof with the teeth of the rotatory clutch member $l$ or $l^1$, as the case may be, while a spring-actuated catch $l^{10}$ engages a tooth $l^{11}$ on the clutch member $l^2$ whenever the latter has been pulled away and disengaged completely from the rotatory clutch member. A trippin $l^{12}$ arranged on the side of the rotatory clutch members $l$, $l^1$ is adapted to engage the catch $l^{10}$ to release the same from the reciprocating clutch member $l^2$, when the change shafts and parts mounted thereon are in normal position. The toothed wheels $l$, $l^1$ are, as shown, provided with blank portions $l^{13}$, the purpose of which will be hereinafter mentioned. Also coöperating with each toothed wheel, or rotatory clutch members $l$, $l^1$, is a second or supplemental reciprocating clutch member $m$, having teeth to engage the teeth of the rotatory clutch member, and said clutch member $m$ is engaged with the rotatory clutch member by means of a bell-crank lever $m^1$, pivoted at $m^2$, whenever the free end of said bell-crank lever is engaged by a tappet $m^3$, which is arranged on the crank-shaft $l^6$ and timed or spaced a suitable distance behind the tappet $l^8$. A spring $m^4$ acts on the reciprocating clutch member $m$ and tends to disengage the same from the rotatory clutch members $l$, $l^1$. The engaged position of the reciprocating clutch member $m$ is fixed by means of a spring-actuated catch $m^5$ which engages with a tooth $m^6$ on said clutch member, and said catch is disengaged from said tooth when the swing or change frame $k$ is moved in the direction of the arrow, Fig. 4, to bring the free end of the catch in contact with a fixed abutment $m^7$ on the casing. The reciprocating clutch members $l^2$ hold the change shafts and parts mounted thereon, such as setting members and coin-ejector actuators to be hereinafter described, in normal position, but, by the disengagement thereof from the rotatory clutch members $l$, $l^1$, they permit the change shafts to turn under the actuation of their springs until the setting members come to rest against the localizing stops. When this is accomplished, the reciprocating clutch members $m$, either or both of them, are caused to lock with the rotatory clutch members and to thus lock the parts controlled through the rotatory clutch members.

The machine, as shown and described, is planned for a given number of coin pockets, but it will be evident that the invention is equally applicable to any suitable number of coin pockets or, in fact, any pockets in which articles, whether coins or anything else, are to be discharged, as in a vending machine. For the present special purpose, twin penny pockets $n$, $n^1$ are shown in Fig. 5. In the same figure is shown pocket $n^2$ for fifty cent pieces, a pocket $n^3$ for twenty-five cent pieces, a pocket $n^4$ for five cent pieces and a pocket $n^5$ for ten cent pieces. These pockets are also shown more or less in Figs. 2, 3, 4, 11 and 12. It will be evident hereinafter that when these pockets are used for coin, the arrangement of the same and the number of the same will be determined by the nature of the fractional currency with which they are to be used, as, for instance, for British coin, a different arrangement would probably be required. In connection with and controlling the coin pockets, coin ejectors $n^6$, $n^7$, $n^8$, $n^9$, $n^{10}$ and $n^{11}$ are provided, these being preferably in the form of slides guided in a suitable bottom plate $n^{12}$. The coin ejectors $n^6$, $n^7$ for pennies and the coin ejector $n^{11}$ for dimes are provided with twin openings $n^{13}$ and $n^{14}$, while the other coin ejectors $n^8$, $n^9$, $n^{10}$ are provided with single openings $n^{15}$. The arrangement of the coin pockets and the means whereby coin may be distributed thereinto will be described hereinafter.

Suitable means are mounted on the respective change shafts to be controlled in their position by the setting members and localizing stops, for the purpose of properly actuating the coin ejectors for discharging the coin, and this means may comprise such devices as the ejector actuators or contacts shown in Figs. 19 to 24. The penny change shaft $k^5$ carries ejector actuators $o$, $o^1$, shown in Figs. 19 and 20 respectively, as also in Fig. 9, the ejector actuator $o$ being provided with relatively prolonged and graduated contacts $o^2$, $o^3$, while the ejector actuator $o^1$ is provided with relatively prolonged and graduated contacts $o^4$, $o^5$. The ejector actuator $o$ is arranged to act upon coin ejector $n^6$ and the ejector actuator $o^1$ on coin ejector $n^7$ for discharging pennies. The coin ejector-actuators $o$, $o^1$ are so arranged and disposed as that by the proper operation thereof either one to three or four pennies will be discharged, and as four pennies are the greatest number of pennies which will be probably required, the steps of the setting member are also preferably arranged for but four pennies. The relative spacing and arrangement of the contacts of the ejector actuators $o$, $o^1$ can be readily determined from said figures. The dotted line in Fig. 20 indicates the position of the edge of the contact $o^2$ relatively to the middle contact $o^5$ of the ejector actuator $o^1$. This disposition locates the short contact $o^2$ and the prolonged middle contact $o^5$ alongside each other so that they are in a plane which passes through the axis of the change shaft. The prolonged contact $o^3$ will be similarly located relatively to the third prolonged contact $o^5$, so that there are arranged successively around the segment of a circle, a contact $o^4$ for discharging one penny, a prolonged contact $o^5$ for discharging two pennies, a contact $o^2$ and a prolonged contact $o^5$ for discharging three pennies, and two prolonged contacts $o^3$, $o^5$, for discharging four pennies, these being set in proper combination with the coin ejectors through the medium of the setting member and its localizing stop controlled by any of the penny keys. No provision is here made for discharging five or more pennies because the equivalent thereof can always be obtained in nickels, dimes, etc., but it will be understood that the invention can be applied to the discharge of any desired number of pennies.

The ejector actuators $p$ for five cent pieces or nickels, the ejector actuators $p^3$ for ten cent pieces or dimes, the ejector actuators $p^6$ for twenty-five cent pieces or quarters, and the ejector actuators $p^9$ for fifty cent pieces or half dollars are so arranged, as will be apparent from the numbered graduations on the scales shown in Figs. 21, 22, 23 and 24, that by a proper combination thereof the least number of coins will be discharged for a given amount of change. The five cent ejector actuator $p$ is provided with graduated contacts $p^1$ which are separated at suitable distances by spaced or blank portions $p^2$ and which, as shown in Fig. 21, are so arranged on a graduated scale, as that out of forty spaces corresponding with the forty spaces on the fractional currency setting member and the forty positions of its corresponding localizing stop a nickel or five cent piece will be discharged only to make up such amounts as single nickels, a nickel in connection with a dime, a nickel in connection with a quarter, etc., for it will be understood that when a dime corresponding with graduation No. 2 is discharged, no nickel is needed, but at the graduation No. 3, which is the next point of five cent value, a nickel would be discharged in connection with a dime, as will be clear from the scale or diagram for the ejector actuator for the dimes. The ten cent ejector actuator is provided with relatively prolonged and graduated contacts $p^4$, $p^5$, the short contacts $p^4$ being for the purpose of moving the coin ejector actuator $n^{11}$ for the dimes only such distance as to discharge one coin or dime, whereas, the prolonged contacts $p^5$ are of sufficient length to move the dime ejector so that both of its openings will be successively brought below the dime pocket and two dimes therein discharged. The twenty-five cent ejector actuator $p^6$ is provided with graduated contacts $p^7$ separated at suitable distances by means of spaces $p^8$, these contacts being arranged as shown on the numbered scale in Fig. 23 so that twenty-five cent pieces or quarters will be discharged only as required. The fifty cent ejector actuator is provided with contacts $p^{10}$ separated by suitable spaces $p^{11}$, these contacts being arranged for discharging fifty cent pieces only when required. As all the fractional currency ejector actuators are arranged on the same shaft, and as the graduated scale for each is the same, it will be a very easy matter to find out what would happen when the setting member remains at a certain given position, by finding out what contacts or spaces would be opposite the slides or coin ejectors at such given position; as for instance, taking the graduated space 3, it will be seen that this includes a corresponding contact on the five-cent ejector actuator and on the ten cent ejector actuator so that five cents or a nickel and ten cents or a dime, making fifteen cents, would be discharged. Taking graduation 8, for instance, it will be seen that this includes three contacts, namely; a five cent contact, a ten cent contact and a quarter contact, so that the corresponding coins, amounting to forty cents, would be discharged. Taking the graduation 18, it will be seen that this includes contacts on all of the fractional currency coin ejectors, namely; a fifty cent contact, a twenty-five cent contact, a ten cent contact and a five cent contact, and ninety cents would be discharged. In similar manner to these examples, various other combinations and examples may be followed up.

Means are provided for locking the drawer, the same being actuated, for the purpose of releasing the drawer $a^1$, from the crank-shaft $l^6$, which is prevented from turning in the direction opposite to that indicated by the arrow in Fig. 4, by means of a pawl and ratchet $q$, Figs. 2 and 3. The pawl and ratchet permits turning of the hand-crank in proper direction for operating those parts to be actuated thereby. Located on the crank-shaft $l^6$ is a striker $q^1$ which is adapted to come in contact with and operate a lever $q^2$, suitably pivoted to a fixed part of the casing $a$, this lever being by means of a link $q^3$, connected with a latch $q^4$ pivoted to the casing, and the head of which is adapted to engage and lock with the inner end of the drawer $a^1$. The head of the latch $q^4$ is beveled at $q^5$ so that when the open drawer is pushed in the latch will be caused to automatically lock the drawer. The opening of the drawer will be referred to hereinafter.

The ejector actuators and setting members controlling them are returned to normal position preferably by suitable means controlled by the inward closing movement of the drawer. These means shown in Figs. 3 and 5 may comprise first, a lug or projection $q^6$, one on each side of the drawer for engaging the opposite sides of the lower swinging end of the swing or change frame $k$, which, as the drawer is pushed in, moves the said frame from the position shown in dotted lines in Fig. 3 to the position shown in full lines thereon, as well as in Figs. 2 and 4; and secondly, stationary racks such as $r$ fixed to the bottom of the casing at the sides of the drawer, which racks act on suitable mechanism mounted on the swing or change frame $k$. Mounted on suitable pivots or shafts at the lower end of the swing or change frame $k$ are traveling gear wheels $r^1$ which mesh with the teeth of the racks $r$ and which turn suitable sprocket wheels $r^2$, also mounted on the same shafts or pivots $r^3$. Over the sprocket wheels $r^2$ are trained sprocket chains $r^4$, which are also trained over the sprocket wheels $r^5$, preferably located at a point about midway of the change frame and mounted on shafts $r^6$. Re-setting gears $r^7$ Fig. 9 are connected with gears $l$ on the penny shaft, and also with the dollar indicating shaft to be hereinafter particularly referred to, the transmitting shafts for these gears being indicated by $r^9$ and which are rotated through the medium of gears $r^8$ mounted on the shafts $r^6$ and meshing with gears $r^{10}$ fixed on the shafts $r^9$ and which in turn mesh with gears $r^{11}$ mounted on a re-setting shaft $r^{12}$. Motion from the re-setting shaft $r^{12}$ is transmitted to the fractional currency change shaft $k^6$ preferably by means of a train of gears $r^{13}$, $r^{14}$, $r^{15}$. In consequence of the described sprocket mechanism and gears operated thereby, it will be evident that, when the swing or change frame is moved from the dotted line position into the full line position shown in Fig. 3, the parts mounted on shafts $k^5$, $k^6$, and the dollar indicating shaft to be hereinafter referred to will be re-set. In moving the swing or change frame $k$ back into its original or normal position, shown in full lines, Figs. 2, 3 and 4, the gears $r^7$ will turn, and in consequence, the wheels $l$, $r^{15}$ will turn until the blank portion $l^{13}$, of wheels $l$ Fig. 31, register with the teeth $r^7$, and then the wheels $l$, $r^{15}$ will turn no farther and the parts actuated thereby will come to rest in normal position. It will here be apparent that the gear wheel $r^{13}$ will transmit motion from the shaft $r^{12}$ to the gear wheel $r^{15}$. This is necessary because shaft $k^6$ on which gear wheel $r^{15}$ is mounted is wholly independent of the shafts $k^5$, $t^{10}$, turned by the gears $r^7$. It will be understood that no matter how far the wheels $l$, $r^{15}$ have been turned in setting the setting members and the ejector actuators, these parts will always come to rest when the blank portions $l^{13}$ oppose the gears $r^7$.

For the purpose of returning the localizing stops $c^5$, $c^6$, $c^7$, to their normal position, suitable means preferably actuated from the hand-crank are provided, these means suitably comprising sprocket wheels $s$ rigidly fixed on the crank shaft $l^6$ over which are trained sprocket chains $s^1$ which are also trained over sprocket wheels $s^2$, mounted on shafts $s^3$, turning in suitable bearings or brackets, such as $s^4$. The shafts $s^3$ carry mutilated gears $s^5$ which mesh with pinions $s^6$, that in turn mesh with gears $s^7$ mounted on the respective rotatory shafts $c$, so that by the turning of the hand-crank, the localizing stops will be re-set into normal position to be properly actuated by the key mechanism. The gears $s^7$ are provided with blank portions $s^8$, Fig. 10, which, at the properly timed moment, oppose the pinions $s^6$ and prevent movement of the localizing stops to any but their proper position.

*Dollar indicating mechanism.*—Incidental to the description of the coin discharging mechanism, parts which co-act with the dollar indicating mechanism have been described, such as the re-setting mechanism for the dollar indicating mechanism, as the description thereof more particularly jibes in with the description of the coin discharging mechanism. The dollar indicating mechanism proper will be now described.

Dollar indicating slides $t$ Figs. 2 and 5 are suitably mounted along side of the coin ejectors, one of the slides for indicating dollars up to the amount of four dollars being provided with four openings or slots $t^1$, $t^2$, $t^3$, $t^4$, Fig. 18 gradually decreasing in length according to their value, while the other slides, such as shown in Fig. 18$^a$ and which are adapted to indicate five dollars and ten dollars, are each provided with a single elongated opening or slot $t^0$. It will be evident to skilled mechanics that any suitable number of slides and parts actuated thereby may be added, according to the scope of the machine, whereas, the key-board is shown as provided for amounts up to one hundred dollars. It will be understood that the actual scope of the mechanism which is shown within the casing $a$ provides only for amounts up to twenty dollars. Opposite each slide opening, so that it may protrude into the same, is a spring-pressed pivoted dog $t^5$, which, by means of a link $t^6$, is connected with a bell-crank catch $t^7$ adapted to engage an indicator or drop $t^8$, on which appears a number indicative of the amount which is to be extracted from the drawer when the indicator or drop falls. The actuating springs of the indicators or drops are indicated by $t^9$ and the said indicators or drops are so disposed relatively to the drawer that, when the drawer is closed, they are automatically raised into the position shown in Fig. 2, and engaged with the catches $t^7$. Preferably, the bell-crank catches $t^7$ are articulated and provided with rule joints, such as $t^x$, so that the indicators or drops may be locked therewith whether the contacts $t^5$ be in proper position or not.

The change shaft $t^{10}$ of the dollar indicating mechanism, which shaft corresponds with and is axially in alinement with the change shafts $k^5$, $k^6$, supports a cam-shaped setting member $t^{11}$ which is stepped, and its steps graduated according to the number of bills to be extracted. The number of steps shown is twenty, as the scope of the machine, as shown in the drawings, provides only for twenty dollars. Referring to Figs. 25, 26 and 27, and also to Fig. 9, it will be seen that there are three actuators for the dollar indicating slides, namely: $t^{12}$, for dollar bills, $t^{13}$, for five dollar bills, and $t^{14}$, for ten dollar bills, the actuators, together with the setting member therefor, being impelled into the proper position as determined by the localizing stop thereof, by means of a spring $t^{15}$ or the equivalent. As appears from the numbered scale on Fig. 27, the dollar slide actuator is provided with four groups of spaced and relatively prolonged and graduated contacts. Contact Number 1 acts on the dollar indicating slide, so that as soon as the dog $t^5$ enters the slot $t^1$, the indicator or drop is released and when the drawer is opened notice is thereby given that one dollar is to be extracted from the drawer. A similar action takes place when a contact 2 causes dogs to enter slots $t^1$, $t^2$, to indicate two dollars, or when the contact 3 causes dogs to enter slots $t^1$, $t^2$, $t^3$, to indicate three dollars, or when the contact 4 causes dogs to enter slots $t^1$, $t^2$, $t^3$, $t^4$, to indicate four dollars. The same action takes place when it is to be indicated that six, seven, eight or nine dollars are to be withdrawn and so on, as will appear from the scale. The actuator $t^{13}$ for the five dollar slide is preferably provided with two groups of contacts which, as appears from the scale on Fig. 26, are so arranged and graduated as that when the contacts strike the five dollar slide, it is indicated that five dollars is to be withdrawn from the drawer. When ten dollars is to be indicated, as appears from the scale in Fig. 25, contacts thereon are so arranged as that the ten dollar slide will be actuated. By the proper operation and combination of the said actuators, it is evident that amounts up to and including nineteen dollars can be indicated, and that the same principle can be carried out *ad infinitum*.

The hand-crank $l^7$ and its shaft $l^6$ are provided with suitable means for limiting the same to one revolution, these means preferably coöperating with the drawer, as will appear. Said stopping device and means for releasing the same so that the crank may be turned at the next purchase are shown in Figs. 4 and 13. A trigger $u$ is pivotally fixed in the lower part of the casing at a point adjacent the rear end of the drawer $a^1$ and is connected by means of a link $u^1$ with a stop $u^2$, having a shoulder $u^3$ and connected by means of a pivot pin $u^5$ with a spring-pressed stop pin $u^4$, which is guided in a suitable stationary housing $u^6$ located adjacent the crank-shaft $l^6$. The pivot connection between the stop $u^2$ and the pin $u^4$ is such that the stop may be lowered from the position shown in Fig. 13 to the position shown in Fig. 4, but, said stop cannot move upwardly beyond the position in Fig. 13 due to a horn or extension $u^7$ projecting from the housing $u^6$. A spring $u^8$ presses upwardly on the stop $u^2$, holding it against the said horn or extension $u^7$; coöperating with the stop $u^2$ is a stop arm $u^9$, extending downwardly from the crank-shaft $l^6$. When the drawer is open the stop $u^2$ will be in the position shown in Fig. 13 and the stop arm $u^9$, by striking the shoulder $u^3$ will limit the rotation of the crank to one full rotation. As the stop arm strikes the shoulder, the pin connected with the stop is drawn out, against the tendency of its spring, so that, when the drawer is closed, the shoulder $u^3$ will be released from the stop arm $u^9$, by the movement of the trigger into the full line position shown in Fig. 4, which causes the pull of the stop shoulder away from the arm $u^9$, and the shoulder will have passed under the outer end of the stop arm into the position shown in Fig. 4 so that, at the next purchase, the hand crank may be given one full rotation. For the purpose of acting on the trigger $u$ when the drawer is pushed in, a hump $u^{10}$ is located on the drawer $a^1$, while a depression $u^{11}$ in the drawer receives the free end of the trigger when the stop arm has been moved past the stop by the first turning movement of the hand-crank.

*Coin distributing mechanism.*—This mechanism as preferably constructed but forming no part of this invention is provided for the purpose of sorting the coins into the appropriate coin pockets $n$, $n^1$, $n^2$, $n^3$, $n^4$, $n^5$. For this purpose, a coin hopper $v$ is preferably arranged in the upper part of the case $a$ as shown in Figs. 3 and 5 and from it, extends a main coin-chute $v^1$, which is provided with separate branch chutes $v^2$ leading to the respective pockets with the exception that the branch chute leading to the penny pockets comprehend both of them. The disposition of the coins in the penny pockets, as they run down the chutes will first take place in the pocket $n^1$ and when this is full, the coins following will, due to the impetus, glance off the upper coin or penny in the pocket $n^1$ and drop into and fill the pocket $n$. Communication between the main coin-chute $v^1$ and the branch chutes and with their corresponding pockets, is established by means of graded or relatively sized separating openings $v^3$, $v^4$, $v^5$, $v^6$ and $v^7$, these openings gradually increasing in size from $v^3$ to $v^7$ and the respective openings being of such size as to admit only and in succession ten cent pieces or dimes, pennies, five cent pieces or nickels, twenty-five cent pieces or quarters, and fifty cent pieces or half dollars. The size of the distributing openings will be determined by the size of the coins. To effectuate the separation of the coins into the proper pockets, the main chute $v^1$ is inclined toward the separating openings, and this inclination, together with the bodily inclination of said chute, causes the coins as they run down the chute and come opposite their appropriate openings to tilt over and fall into the corresponding branch chute and coin pocket. It will be seen that as the opening $v^3$ is too small for pennies, the pennies will pass said opening and tip and fall through the next opening $v^4$, at the receiving end of the long branch chute leading to penny pockets $n$, $n^1$ their impetus as they run down the incline not being sufficient to carry them onward to the next openings which are for coins of larger size. In the same way the other coins will fall through their appropriate openings and pile up in the pockets. As it is desirable, and in fact necessary, to cause the coins to assume such slant as that they will tip over into the branch chutes without entering the wrong chutes, the lower edge or run-way of the main chute is provided with a lip or ledge $v^8$ which forms, at the lower portions of the separating openings, wards to preclude the lower edges of the coins from entering the openings first. The branch chutes communicate with and lead to overflow chutes $v^9$, the upper ends of which also communicate with the coin pockets, and the slant or incline of the branch chutes is toward the overflow chutes, but the pockets are so disposed relatively to the branch chutes that, as the coins pass down the branch chutes, they will fall directly into the pockets, due to the fact that the advancing edge of the coin as it falls from each branch chute will strike the farther side of the coin pocket and thus the coins will fall into and pile up in the coin pocket. When, however, a coin pocket is full, those coins of the same denomination which might otherwise pass into the pocket strike the upper coin of the pile at their advancing edges, but as they strike the said upper coin at a slant, they will simply glance off of the pile and pass into the overflow chute. The overflow chutes $v^9$ communicate with corresponding compartments $v^{10}$ in the drawer.

The coins are discharged from their respective pockets by means of the coin ejectors as before described. The proper discharge is accomplished by means of an upsetting bottom or canting device $v^{11}$ Figs. 11 and 12 which is fixed to each ejector slide so that in the normal inward position of the slides such as $n^8$, $n^9$, $n^{10}$, the inner edge thereof will come short of half of the diameter of the openings $n^{15}$ in the said slide. Below the openings in the slides are inclines $v^{12}$, leading into a change compartment $v^{13}$ which is provided with a suitable change door $v^{14}$. It will be evident that as the slide or ejector is pushed in, together with its bottom part or canting device $v^{11}$, the opposite side of the coin being heavier, will tilt downwardly and upon the inner edge of the said canting device, thus causing the coin to fall from its opening and slide down the incline to be extracted through the door. The slides are returned into their normal position preferably by springs $v^{15}$ and the overflow chutes pass through suitable slots $v^{16}$ in the slides or coin ejectors.

*Register.*—The register preferably constructed as now to be described, but forming no part of the present invention comprises suitable means for indicating to the purchaser the amount paid for the article purchased, which is actuated from the amount-purchased keys and a suitable adding device which may be of any well known construction, as also a printing device. For transmitting motion from the amount-purchased keys to the register, projections $w$ located on the push rods of said keys as indicated in Figs. 2 and 10, are preferred. These projections are arranged in as many series of nine each to a series as there are keys for the amount purchased divided by nine. For instance, keys for the units of cents may have on their push rods nine projections, the keys for the tens of cents may have likewise nine projections on their push rods; the keys for the units of dollars, nine projections on their push rods, and so on. Opposite and coöperating with the nine projections $w$ of any series is a suitable pivoted lever $w^1$ provided with a cross-rod $w^2$ in common with all nine projections, this cross-rod being arranged to extend transversely of the push rods so that the push rods from one to nine will have to move relatively decreasing distances when the push rods are pushed in for operating the key-actuated mechanism, together with the register. This is indicated by the numerals nine to one in Fig. 2, which appear above the corresponding projections $w$. Each lever $w^1$ is connected with a second lever $w^3$ by means of a connecting link $w^4$ from which extends a link $w^5$ which connects with a slide $w^6$ guided in a suitable slide-way $w^7$ fixed to the casing. There are, of course, as many of these slides as there are series of keys with nine keys to each series. Each slide $w^6$ is provided with a toothed rack $w^8$, the teeth of which are beveled backwardly, and the square shoulders of which teeth are adapted to be engaged by a pivoted spring pressed catch $w^9$. There are as many teeth on each rack as there are projections on the series of keys belonging to the rack, and these teeth are graduated from one to nine, the graduations being the reverse of the graduations of the series of projections. The catch $w^9$ is provided with an arm $w^{10}$ which may be engaged for the purpose of releasing the catch from the rack by means of a tappet $w^{11}$ located on the crank-shaft $l^6$, as shown in Fig. 4. Preferably, localizing means substantially the same in principle as the localizing means shown in Figs. 2, 34 and 35 of the key actuated mechanism are provided for the register. To this end, the slides $w^6$ are each provided with a stop arm $w^{12}$, constituting a localizing stop, and said arm is pivoted to the slide at $w^{13}$, the pivot joint being formed as a rule joint so that the localizer arm or stop can be moved on its pivot in one direction laterally of the slide, but not in the other direction. It is moved laterally for the purpose of enabling the return of the same and its slide. A spring $w^{14}$ moves the localizer arm or stop into proper position for acting as a stop. The cross section of the localizer stop or arm is preferably triangular or at least is provided with two converging beveled edges $w^{15}$, Fig. 35, for the purpose to hereafter appear. When the catch $w^9$ is released from the rack $w^8$, a suitable spring $w^{16}$ returns the rack and slide to position shown in Fig. 2.

Figs. 2, 4, 5 and 9 show indicator disks $x$, $x^1$, $x^2$, $x^3$ and $x^4$, which are loosely mounted upon a stationary indicator shaft $x^5$, mounted in the casing $a$, said disks having upon their respective circumferences numbers ranging in sequence from 0 to 9, in similar manner to calculators, and adding machines, for the purpose of indicating through a suitable window in the casing what amount-purchased keys have been actuated. Stepped setting members $x^6$ substantially the same in function as the setting members of the coin discharging mechanism are fixed one to each indicator disk; the steps of the setting members are numbered from 1 to 9 inclusive and are so disposed that, when the localizing stop $w^{12}$ is moved one space, tooth 1 which is next adjacent to 0 tooth normally engaged with the step, is adapted to strike the said stop and bring the setting member and its corresponding indicator disk to rest. The setting members $x^6$ and their corresponding indicator disks are impelled to rotate, when released, by means of suitable springs $x^7$, one for each indicator disk, and its setting member. It will be evident that if, for instance, the amount-purchased key indicating eight cents is pushed to actuate the key actuating mechanism and hence the register, the localizing stop $w^{12}$ will be moved to position 8, and the corresponding setting member will, at the proper time, turn with its indicator disk and bring its tooth 8 in contact with the localizer stop, whereupon the corresponding numeral on the circumference of the indicator disk will be exhibited to the purchaser. The crank shaft $l^6$ carries a rigidly mounted fixed segment $x^8$ adapted to act on a spring pawl $x^9$ as hereinafter stated, which pawl by means of a link $x^{10}$ is connected with a trip lever $x^{11}$, the free end of which may be engaged by the advancing edge of the segment $x^8$, and during the movement of the segment past said trip lever, the segment is constantly pressing on said lever to retract the pawl $x^9$. Fixed on the crank shaft $l^6$ are mutilated gear wheels $x^{12}$ which, in the normal position of the parts, are out of engagement with gears $x^{13}$ but the teeth of which are adapted, under the actuation of the hand-crank, to mesh with the teeth of said gears and which latter, in turn, mesh with gears $x^{14}$ mounted on shafts $x^{15}$ arranged counter to the indicator shaft $x^5$. There are as many gears $x^{14}$ and $x^{13}$ as there are indicator disks, and these are provided at one side with gears $x^{16}$ which mesh with the corresponding gears $x^{14}$. Each gear wheel $x^{16}$ is engaged by one of said pawls $x^9$. When the hand-crank has been turned one full rotation and the register actuated, the indicator disks and gear wheels will be set to indicate the last purchase. It therefore becomes necessary at the beginning of the next turning movement of the hand crank to immediately return the indicator disks to proper position. By the turning of the hand crank the mutilated gear $x^{12}$ is turned in the direction of the arrow, Fig. 4, and the teeth thereof mesh with the gear $x^{13}$ and transmit motion in opposite direction to the indicator disks, thus returning them until their blank portions shown in Fig. 4 match with the gears $x^{14}$. When the return of the indicator disks has been accomplished, the segment $x^8$ on the hand-crank shaft strikes trip lever $x^{11}$ and disengages the pawl $x^9$ from the corresponding gear wheel $x^{16}$, thereby permitting the actuating spring of the disk to immediately act on the same and bring the appropriate tooth of the corresponding setting member $x^6$ in contact with localizing stop $w^{12}$, which has already been set. When the segment $x^8$ passes the trip lever $x^{11}$, the pawl $x^9$ automatically engages the toothed wheel $x^{16}$ and locks the indicator disk in indicating position. While the setting members and indicating disks are so locked the localizing stop or stops actuated are to be returned, and this return is effectuated through the medium of the tappet $w^{11}$ striking the arm $w^{10}$ of the catch $w^9$ and releasing it from the lock $w^8$, which, together with the localizing stop, return to normal position. The return of the localizing stop being permitted by reason of the beveled edge of the stop coming in contact with the toothed or stepped portion of the setting member, which, acting on the beveled edge or inclined portion deflects the localizing stop, swinging or moving the same on its pivot $w^{13}$. When the setting member is returned to initial position at the beginning of each hand crank movement, the localizing stop, or stops, which is under spring tension, is automatically snapped or returned into position to be located in the path of the teeth or steps of the setting member when it is spaced to stop the rotary motion of the setting member and indicator disk.

The adding wheels and mechanism $y$ forming no part of the present invention may be of any suitable construction to be actuated from the indicator wheels and preferably they are actuated from the indicator wheels or disks in the manner shown, as by shafts $y^1$ corresponding in number with the indicator disks and the adding disks, which shafts are provided with pinions $y^2$ which mesh with the disk gears $x^{16}$ and with the gears of the adding wheels. The amount of each sale may be printed on a suitable tape or band, such as $z$, by means of any suitable printing mechanism such as shown in Figs. 3 and 4. The printing mechanism is actuated in any suitable and convenient manner from the crank shaft, as through a reciprocating part $z^1$ provided with a pawl for acting on a ratchet $z^2$ on the tape or band winding shaft and with a pawl $z^3$, which holds the impression lever $z^4$ normally retracted, such impression lever being released in any suitable and convenient manner.

*General.*—A general description of the time or sequence of operation of the parts actuated from the hand-crank will be given, it having been made clear how the localizing stops are brought into proper position. After the keys have been actuated the operator takes hold of the hand-crank and turns the same in the direction of the arrow, Fig. 4, the effect of which is to immediately release the ejector actuators and their setting members of the coin discharging mechanism so that they may be brought to proper position corresponding with the localizing stops. The next step in the operation is the return of the indicator disks of the register to normal position by means of the mutilated gears $x^{12}$, and the train of gears actuated therefrom; next the re-locking of the ejector actuators of the coin discharging mechanism as already explained, and then the actuation of the indicator disks of the register, effectuated through the release of their wheels by means of the segment $x^8$, and then the resetting of the locks and localizing stops of the key actuated mechanism. Then the resetting of the localizing stops of the register effectuated through the medium of the tappet $w^{11}$, after which the tappet $q^1$, successively acts to return the deflectors $q^1$ and $q^9$ to normal position by striking a pivoted arm $y^{10}$, suitably connected with the oscillating shaft $g^2$, and then to act to release the drawer as hereinbefore described, it being understood that the drawer is automatically opened under the actuation of a suitable spring; and then the contact of the stopping arm on the crank shaft with its stop.

The spring $k^2$ acts on the swing or change frame, constantly tending to move the same forward and actuate the coin ejectors and other parts before described, so that the said frame is moved into the dotted line position shown in Fig. 3. The outward position of the said change frame is limited by a stop lug $y^{11}$. The return of the swing or change frame from the dotted line position into the full line position is accomplished by the closing of the drawer, effectuated through the medium of the projection or projections $q^6$ on the drawer which engage the lower or swinging end of said change frame. When the drawer has been pushed in it will be automatically locked as has been described, and this, in turn, will lock the change frame.

Various modifications and changes can be resorted to in the various parts, portions or elements of this machine, as will be evident to skilled mechanics, and some parts may be used without others, and other parts substituted for some of the parts, and the invention is therefore not limited to the construction and operation shown and described, but is intended to include any machine of similar character possessing novel points or features now to be claimed.

Having thus described my invention, what I claim as new therein and desire to secure by Letters Patent is:

1. In combination with change discharging means, localizing means therefor, differential slides provided with stop shoulders and having variable limits of motion, guides for the slides, and keys for acting on the slides.

2. In combination with change discharging means, localizing means therefor comprising a rack, a gear-wheel acting on the same, the shaft of said gear, gears loose on the shaft, pawl-and-ratchet devices between the loose gears and shaft, and separately actuated means acting independently on each of the loose gears.

3. In combination with change discharging means, localizing means therefor comprising a rack, a gear-wheel acting on the same, the shaft of said gear, gears loose on the shaft, pawl-and-ratchet devices between the loose gears and shaft, toothed segments acting on said loose gears, and key-actuated devices acting on said segments.

4. In combination with change discharging means, localizing means therefor comprising a rack, a gear-wheel acting on the same, the shaft of said gear, gears loose on the shaft, pawl-and-ratchet devices between the loose gears and shaft, toothed segments acting on said loose gears, differential spacers, and push rods provided with keys and acting on the spacers.

5. In combination with change discharging means, localizing means therefor comprising toothed racks, a shaft, gears thereon acting on said racks, and independently actuated pawl-and-ratchet devices acting on some of said gears.

6. In combination with change discharging means, localizing means therefor comprising a rack, a gear-wheel acting on the same, the shaft of said gear, gears loose on the shaft, pawl-and-ratchet devices between the loose gears and shaft, separately actuated means acting independently on each of the loose gears, and resetting means for the localizing means.

7. In combination with change discharging means, localizing means therefor comprising toothed racks, a shaft, gears thereon acting on said racks, independently actuated pawl-and-ratchet devices acting on some of said gears, and re-setting means for the localizing means.

8. In combination with key-actuated devices having variable positions, means for retaining each device in a number of partially actuated positions, catches mounted in said positions relatively to the key-actuated devices for securing the retaining means out of action upon a full actuation of each said device, trips and means acting on the trips to disengage them from the catch.

9. In combination with key-actuated devices having variable positions, means for retaining each device in a number of partially actuated positions, catches mounted in said positions relatively to the key-actuated devices for securing the retaining means out of action upon a full actuation of each said device, pivoted trips mounted in said positions relatively to the said key-actuated devices, and a nose on each device for acting on each trip.

10. The combination of coin droppers or ejectors for coins of different denominations having coin openings, adjustable coin dropper or ejector-actuators mounted on an axis of rotation which is shiftable laterally, a drawer whereby said lateral shifting is performed, and localizing means having variable limits of motion for determining the position of the actuators.

11. The combination of tens of units spacers provided with means for variably limiting their position, and means for eliminating one of the positions of each spacer.

12. In combination with means for obtaining fractional currency, means for obtaining higher units and their multiples, means for eliminating one of said units and for compensating therefor and obtaining its equivalent in fractional currency, the drawer, and means actuated by the drawer for resetting the eliminating and compensating means.

13. The combination of a plurality of localizers, the actuating shafts therefor, and means for actuating one shaft for a less amount at the end of the movement of the other shaft and for returning the so-actuated shaft to its normal position.

14. The combination of change discharging means, localizers for controlling the position of the same, key mechanism for obtaining fractional currency above a given value, as for instance five cents or a nickel and ten cents or a dime, and for acting on one of said localizers, key mechanism for acting on another of said localizers for obtaining an amount less than said value, a subtractor head in common with keys of the latter key mechanism, and means, whereby, through the actuation of said head by any of said keys, said first localizer is acted on to subtract an amount equal to said given value of fractional currency obtained thereby, as for instance five cents or a nickel and ten cents or a dime.

15. The combination of a change shaft provided with actuators thereon, means tending to rotate the change shaft, and means for locking the same in normal position, with change devices operated by said actuators.

16. The combination of a change shaft provided with actuators thereon, means tending to rotate the change shaft, resetting means, and means for locking the shaft in normal position, with change devices operated by said actuators.

17. The combination of a change shaft provided with actuators, the shaft having a normal position and an adjusted position, means for locking the same in normal position, and means for disengaging the locking means from the change shaft, with change devices operated by said actuators.

18. The combination of a change shaft having a normal position and an adjusted position, means for locking the same in normal position, and a hand-crank provided with a tappet for acting on a part of the locking means to release the change shaft.

19. The combination of a change shaft having a normal position and an adjusted position, means for locking the same in normal position, means for locking the same in adjusted position, and means acting on both locking means to unlock the change shaft therefrom.

20. The combination of a change shaft having a normal position and an adjusted position, means for locking the same in normal position, means for locking the same in adjusted position, means tending to rotate the shaft to adjusted position, and means acting on both locking means to unlock the change shaft therefrom.

21. The combination of a change shaft having a normal position and an adjusted position, means for locking the same in normal position, means for locking the same in adjusted position, means tending to rotate the shaft to adjusted position, re-setting means for the shaft, and means acting on both locking means to unlock the change shaft therefrom.

22. The combination with coin discharging mechanism comprising coin ejectors, ejector-actuators having a plurality of positions, of means for locking the support in ejector-actuators and a support for the normal position, and a crank shaft provided with a tappet for acting on a part of the locking means to release the support.

23. The combination with coin discharging mechanism comprising coin ejectors, ejector-actuators and a support for the ejector-actuators having a plurality of positions, of means for locking the support in normal position, means for locking the same in adjusted position, and means acting on both locking means to unlock the support therefrom.

24. The combination with coin discharging mechanism comprising coin ejectors, ejector-actuators and a support for the ejector-actuators having a plurality of positions, of means for locking the support in normal position, means for locking the same in adjusted position, means tending to move the support to adjusted position, and means acting on both locking means to unlock the support therefrom.

25. The combination with coin discharging mechanism comprising coin ejectors, ejector-actuators and a support for the ejector-actuators having a plurality of positions, of means for locking the support in normal position, means for locking the support in adjusted position, means tending to move the support to adjusted position, re-setting means for the support, and means acting on both locking means to unlock the support therefrom.

26. The combination with coin discharging mechanism, a lock for a portion of the same, indicators for indicating the amount of purchase, devices for returning the same to normal position, a second lock for an adjusted position of said portion of the coin discharging mechanism, and crank-operated strikers or tappets acting on said locks and returning devices.

27. The combination with coin discharging mechanism, a lock for a portion of the same, indicators for indicating the amount of purchase, devices for returning the same to normal position, a second lock for an adjusted position of said portion of the coin discharging mechanism, detent means for securing the indicators in normal position, and crank-operated strikers or tappets and a segment acting on said locks, returning devices and detent means.

28. The combination with coin discharging mechanism, a lock for a portion of the same, indicators for indicating the amount of purchase, devices for returning them to normal position, a second lock for an adjusted position of said portion of the coin discharging mechanism, detent means for securing the indicators in normal position, localizing stops for controlling the position of the said indicators, and crank-operated strikers or tappets and a segment acting on said locks, returning devices, detent means and localizing stops.

29. The combination with coin discharging mechanism, a lock for a portion of the same, indicators for indicating the amount of purchase, devices for returning them to normal position, a second lock for an adjusted position of said portion of the coin discharging mechanism, detent means for securing the indicators in normal position, localizing stops for controlling the position of the said indicators, a drawer, a latch device therefor, and crank-operated strikers or tappets and a segment acting on said locks, returning devices, detent means, localizing stops and latch device.

30. The combination with coin discharging mechanism comprising rotary parts, a lock for said rotary parts, indicators for indicating the amount of purchase, devices for returning them to normal position, and hand-operated means acting to control said lock and returning devices.

31. The combination with coin discharging mechanism, a lock for a portion of the same, indicators for indicating the amount of purchase, devices for returning the same to normal position, a second lock for an adjusted position of said portion of the coin discharging mechanism, and means acting to control said locks and returning devices.

32. The combination with coin discharging mechanism, a lock for a portion of the same, indicators for indicating the amount of purchase, devices for returning the same to normal position, a second lock for an adjusted position of said portion of the coin discharging mechanism, detent means for securing the indicators in normal position, and means acting to control said locks, returning devices and detent means.

33. The combination with coin discharging mechanism, a lock for a portion of the same, indicators for indicating the amount of purchase, devices for returning them to normal position, a second lock for an adjusted position of said portion of the coin discharging mechanism, detent means for securing the indicators in normal position, localizing stops for controlling the position of the said indicators, and means acting to control said locks, returning devices, detent means and localizing stops.

34. The combination with coin discharging mechanism, a lock for a portion of the same, indicators for indicating the amount of purchase, devices for returning them to normal position, a second lock for an adjusted position of said portion of the coin discharging mechanism, detent means for securing the indicators in normal position, localizing stops for controlling the position of the said indicators, a drawer, a latch device therefor, and means acting to control said locks, returning devices, detent means, localizing stops and latch device.

35. The combination with coin discharging mechanism, a lock for a portion of the same, indicators for indicating the amount of purchase, devices for returning them to normal position, a second lock for an adjusted position of said portion of the coin discharging mechanism, detent means for securing the indicators in normal position, localizing stops for controlling the position of the said indicators, a drawer, a latch device therefor, crank-operated strikers or tappets and a segment acting on said locks, returning devices, detent means, localizing stops and latch device, and means for limiting the motion of the tappets or strikers.

36. The combination of adjustable ejector and indicator actuators mounted on a plurality of independent shafts, means for adjusting the actuators, and ejectors and indicators disconnected from and operated by said shafts.

37. The combination of a plurality of sets of ejector and indicator actuators, one for ejecting coins of smallest denomination, one for ejecting coins of larger denomination, and one for operating paper currency indicators, each set being mounted on an independent shaft, means for adjusting the actuators, and ejectors and indicators disconnected from and operated by said shafts.

38. The combination of a plurality of sets of ejector actuators, each set mounted on an independent shaft, ejecting and indicating means disconnected from said shafts, and means for adjusting the actuators in such relation to each other as to cause them to act on said ejecting and indicating means to eject and indicate correct change when operated.

39. The combination of three sets of ejector actuators, one for ejecting coins of smallest denomination, one for ejecting coins of larger denomination, and one for operating paper currency indicators, each mounted on an independent shaft, ejecting and indicating means disconnected from said shafts, and means for adjusting the shafts in such relation to each other as to cause them to eject and indicate correct change when operated.

40. The combination of adjustable ejector and indicator actuators, mounted on a plurality of independent shafts, a bodily movable change frame on which all of said shafts are mounted, means for adjusting the actuators, and ejectors and indicators operated by said shafts.

41. The combination of a plurality of sets of ejector and indicator actuators, one for ejecting coins of smallest denomination, one for ejecting coins of larger denomination, and one for operating paper currency indicators, each set being mounted on an independent shaft, a bodily movable change frame on which all of said shafts are mounted, means for adjusting the actuators, and ejectors and indicators operated by said shafts.

42. The combination of a plurality of sets of ejector actuators, each set mounted on an independent shaft, a bodily movable change frame on which all of said shafts are mounted, ejecting and indicating means, and means for adjusting the actuators in such relation to each other as to cause them to act on said ejecting and indicating means to eject and indicate correct change when operated.

43. The combination of three sets of ejector actuators, one for ejecting coins of smallest denomination, one for ejecting coins of larger denomination, and one for operating paper currency indicators, each mounted on an independent shaft, a bodily movable change frame on which all of said shafts are mounted, ejecting and indicating means, and means for adjusting the shafts in such relation to each other as to cause them to eject and indicate correct change when operated.

44. The combination of adjustable ejector actuators mounted on a plurality of independent shafts, means for adjusting the actuators, and ejectors disconnected from and operated by said shafts.

45. The combination of a plurality of sets of ejector actuators, one for ejecting coins of smallest denomination, one for ejecting coins of larger denomination, each set being mounted on an independent shaft, means for adjusting the actuators, and ejectors disconnected from and operated by said shafts.

46. The combination of a plurality of sets of ejector actuators, each set mounted on an independent shaft, ejectors disconnected from said shafts, and means for adjusting the actuators in such relation to each other as to cause them to act on said ejecting means to eject correct change when operated.

47. The combination of adjustable ejector and indicator actuators mounted on a plurality of independent shafts, means for adjusting the actuators, and ejectors and indicators operated by said shafts.

48. The combination of a plurality of sets of ejector and indicator actuators, one for ejecting coins of smallest denomination, one for ejecting coins of larger denomination, and one for operating paper currency indicators, each set being mounted on an independent shaft, means for adjusting the actuators, and ejectors and indicators operated by said shafts.

49. The combination of a plurality of sets of ejector actuators, each set mounted on an independent shaft, ejecting and indicating means, and means for adjusting the actuators in such relation to each other as to cause them to act on said ejecting and indicating means to eject and indicate correct change when operated.

50. The combination of three sets of ejector actuators, one for ejecting coins of smallest denomination, one for ejecting coins of larger denomination, and one for operating paper currency indicators, each mounted on an independent shaft, ejecting and indicating means, and means for adjusting the shafts in such relation to each other as to cause them to eject and indicate correct change when operated.

Signed at New York, N. Y. this 28″ day of June 1904.

LINDLEY KLEINHANS.

Witnesses:
  Geo. L. Wheelock,
  John J. Donovan.